United States Patent
Chugh

(10) Patent No.: US 6,554,888 B1
(45) Date of Patent: Apr. 29, 2003

(54) STABILIZATION OF COAL WASTES AND COAL COMBUSTION BYPRODUCTS

(75) Inventor: Yoginder P. Chugh, Murphysboro, IL (US)

(73) Assignee: The Board of Trustees of Southern Illinois University, Carbondale, IL (US)

( * ) Notice: Subject to any disclaimer, the term of this patent is extended or adjusted under 35 U.S.C. 154(b) by 0 days.

(21) Appl. No.: 09/481,340

(22) Filed: Jan. 12, 2000

(51) Int. Cl.$^7$ ............................................ C04B 18/12
(52) U.S. Cl. ................... 106/DIG. 1; 588/252; 588/256
(58) Field of Search .................... 106/DIG. 1; 588/252, 588/256

(56) References Cited

U.S. PATENT DOCUMENTS

| | | | |
|---|---|---|---|
| 3,870,535 A | * 3/1975 | Minnick et al. | |
| 4,013,440 A | 3/1977 | Vale | |
| 4,116,705 A | * 9/1978 | Chappell ............... 106/DIG. 1 |
| 4,230,568 A | * 10/1980 | Chappell .................... 210/751 |
| 4,405,331 A | * 9/1983 | Blaustein et al. ................. 44/1 |
| 4,469,503 A | 9/1984 | Stockel | |
| 4,514,307 A | * 4/1985 | Chestnut et al. ............ 210/751 |
| 4,526,607 A | 7/1985 | Rosenberg | |
| 4,541,857 A | 9/1985 | Snively | |
| 5,248,327 A | 9/1993 | Laker et al. | |
| 5,277,826 A | 1/1994 | Burns et al. | |
| 5,302,524 A | 4/1994 | Van De Venter et al. | |
| 5,451,240 A | 9/1995 | Trowbridge | |
| 5,468,276 A | 11/1995 | Roth et al. | |
| 5,468,277 A | 11/1995 | Rehbein et al. | |
| 5,501,973 A | 3/1996 | Mayfield | |
| 5,627,133 A | * 5/1997 | Nelson | |

FOREIGN PATENT DOCUMENTS

| | | | |
|---|---|---|---|
| AU | 536637 | * | 5/1984 |
| CZ | 213690 | * | 4/1982 |
| DE | 3420171 | * | 2/1986 |
| DE | 19517603 | * | 11/1996 |
| JP | 59018137 | * | 1/1984 |
| JP | 09295912 | * | 11/1997 |
| RO | 87766 | * | 12/1985 |

OTHER PUBLICATIONS

"Mineral recovery from coal conversion solid wastes" Burnet et al. Inst Chem Eng Symp Ser (1982), 78 (energy: Money material Eng) T5/21–T5/30). Iowa St. Univ.*

"Use of industrial wastes for production of cmeent and other valuable products" Derdacka et al. Stavivo (1976), 54(7), 234–7.*

* cited by examiner

Primary Examiner—Paul Marcantoni
(74) Attorney, Agent, or Firm—Thompson Coburn LLP

(57) ABSTRACT

A fill material mix that includes coal processing wastes, at least one coal combustion by-product and a neutralizing/stabilizing by-product that may be the same as or different than the coal combustion by-product is mixed with water to form a mortar. The mortar can be placed in abandoned mines and other appropriate underground or surface locations as a fill material that is environmentally more benign that the individual components of the mix. The mortar cures rapidly to provide a surface that can support heavy equipment.

38 Claims, 10 Drawing Sheets

STABILIZATION OF COAL WASTES AND COAL COMBUSTION BYPRODUCTS

BACKGROUND OF THE INVENTION

1. Field of the Invention

The present invention relates to a method for stabilizing coal wastes and to the products that result, and more particularly to a method for stabilizing coal wastes for use as an environmentally stable fill material.

2. Description of the Related Art

Almost one-third of the coal produced in the United States is processed to remove ash and/or sulfur prior to marketing and use. The processing wastes that result from this processing include coarse coal refuse and fine coal processing waste. The coal processing waste (CPW) constitutes about 10%–30% of the run-or-mine coal and, when the processing wastes occur as by-products of desulfurization operations, it can contain particularly high levels of sulfur. Disposal of these wastes is costly and poses long-term environmental problems—including acid mine drainage, erosion and sedimentation, lack of vegetative growth, negative impacts on aquatic life, and objectionable aesthetic appearance of disposal areas. It is estimated that the present disposal costs for coarse and fine coal processing wastes adds a significant amount (estimated at 3% to 5%) to the total cost of coal delivered to the customer.

The large majority of coal that is produced in the United States is combusted for the generation of heat, steam and power. The combustion of coal results in the generation of coal combustion by-products (CCB's), such as fly ash, bottom ash and scrubber sludge. When typical Midwestern U.S. coal is combusted, it is estimated that the amount of fly ash and bottom ash that are formed are about 8% and 2%, respectively, of the weight of the coal that is combusted. In addition, scrubber sludge is formed in the amount of about 5% to 10% of the weight of the coal combusted. Thus, besides the coal processing wastes, which are more-or-less simply coal particles that are too small to handle and market, the burning of coal causes the additional burden of coal combustion by-products that must be disposed of.

Typical coal combustion by-products possess several characteristics that can cause environmental problems if the materials are not disposed of carefully. The materials are often alkaline and high pH leachate from fly-ash ponds, or unsealed landfill areas, can cause unacceptable environmental damage. Moreover, such materials can be the source of unacceptable levels of harmful leached elements, such as iron, boron, chromium, lead, selenium and zinc, among others.

Due to the large scale of the coal mining industry and the importance of coal as an energy source, a number of methods for managing these coal combustion by-products have been devised. For example, blends of fly ash with a number of diverse materials have been reported for the purpose of producing soil amendments or fertilizers. U.S. Pat. No. 5,451,240 to Trowbridge discloses the combination of coal ash with humate ore (identified as an oxidized form of lignite coal) in which humic acids have been activated, as by addition of an alkali. The resulting product was prilled and is reported to have excellent plant growth stimulant abilities.

U.S. Pat. No. 5,468,277 to Rehbein et al. discloses mixing a sulfate-containing coal ash, such as fluidized bed combustion (FBC) ash, with water and applying the slurry to soil to elevate the pH of the top layer of soil and working the soil to distribute the ash into the soil either before or after the material hardens.

U.S. Pat. No. 5,277,826 to Bums et al. teaches a method to stabilize waste water treatment sludge by mixing it with fly ash and a source of lime. The product has either soil-like form or load-bearing form. U.S. Pat. No. 5,468,276 to Roth et al. discloses the production of fertilizer chips by blending coal fly ash with manure and compressing the material into a sheet, which is fractured into chips that are useful as fertilizer. U.S. Pat. No. 4,541,857 to Snively teaches that a plant growth inducing compound can be produced by mixing particulate coal with a source of sodium molybdate. Other references, such as U.S. Pat. Nos. 4,013,440; 4,469,503; 4,526,607; 5,248,327; 5,302,524; 5,501,973; and 5,627,133 provide yet more methods to use and/or safely dispose of one or more coal combustion by-products.

Notwithstanding the progress that has been made in the methods for disposing and using wastes resulting from the mining and use of coal, there is still an unmet need for a method to manage coal processing wastes and coal combustion byproducts economically. It would be particularly useful if a method could be found that would derive some value from such wastes—especially if this could be done without the addition of some other, more valuable, material, or without the expenditure of a great amount of energy. It would be even more useful if the management technique would provide a valuable product from the coal wastes that could be used in a relatively short time and without requiring an inordinately large amount of space. Finally, it would be particularly useful if a useful management method could be found that would mitigate the harmful environmental impact of the coal wastes—such as acid drainage and leaching of harmful metals.

BRIEF SUMMARY OF THE INVENTION

Briefly, therefore, the present invention is directed to a novel fill material mix comprising coal processing waste, at least one coal combustion by-product and a neutralizing/stabilizing by-product that is the same as or different than the coal combustion by-product.

The present invention is also directed to a novel mortar comprising a mixture of coal processing waste, at least one coal combustion by-product, a neutralizing/stabilizing by-product that may be the same as or different than the coal combustion by-product, and water in an amount sufficient to permit curing of the mixture.

The present invention is also directed to a novel fill material comprising the cured product of a mixture of coal processing waste, at least one coal combustion by-product and a neutralizing/stabilizing by-product and water in an amount sufficient to permit curing of the mixture.

The present invention is also directed to a novel method for stabilizing coal processing wastes comprising intermixing water, coal processing waste, at least one coal combustion by-product and a neutralizing/stabilizing by-product that may be the same as or different than the coal combustion by-product, in proportions sufficient to cause the mixture to have an acid/base potential of 1/1, or lower.

Among the several advantages found to be achieved by the present invention, therefore, may be noted the provision of a method to manage coal processing wastes and coal combustion wastes economically and, particularly, a method that derives value from such wastes without the addition of some other, more valuable, material, and without the expenditure of a great amount of energy; the provision of a valuable product from the coal wastes that can be used in a relatively short time and without requiring an inordinately large amount of space; and the provision of a method that permits the mitigation of the harmful environmental impact of the coal wastes—such as acid drainage and leaching of harmful metals.

DETAILED DESCRIPTION OF THE PREFERRED EMBODIMENTS

Figure 1:
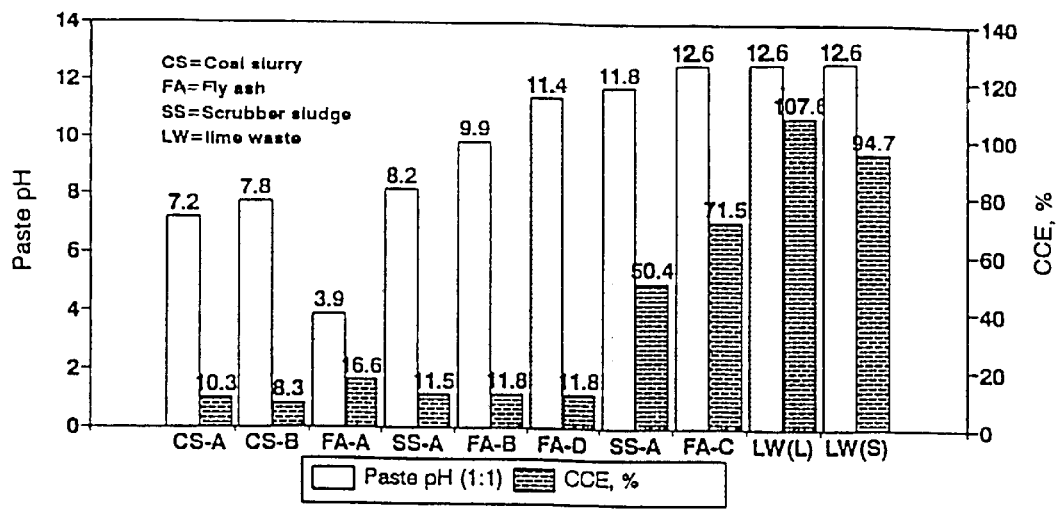
FIG. 1 shows the calcium carbonate equivalent (CCE), and the pH of a 1:1 weight:volume mixture of solids in water (the paste pH), for various solids which can be components of the mixes according to the present invention.

In accordance with the present invention, it has been discovered that an environmentally stable fill material can be produced by intermixing coal processing wastes with at least one coal combustion by-product in appropriate relative amounts. In situations where the coal combustion by-product is one that does not possess sufficient acid-neutralizing potential to at least balance the acid that may be produced by the coal processing waste, and/or does not possess sufficient binding potential to stabilize the fill material against unacceptable leaching, at least one other neutralizing/stabilizing by-product can be added to the mix. In other situations, however, the coal combustion by-product alone has sufficient acid-neutralizing potential to neutralize all acid from the coal processing waste, and also has sufficient binding potential to stabilize the fill material against unacceptable leaching, and no separate neutralizing/stabilizing by-product is needed. The combination of the coal combustion by-product and the neutralizing/stabilizing by-product, besides acting to prevent acid leaching and leaching of toxic or harmful elements and compounds, also acts as a curing agent when mixed with the coal processing waste and water.

The inventor has also found that the strength of the cured and stabilized fill material can be varied according to the requirements of the application. As will be described in detail below, the strength can be controlled by the type of components that comprise the mix, and upon the relative amounts of water, coal processing wastes and combination of coal combustion by-products and neutralizing/stabilizing by-product that are present in the mix.

The novel method and novel fill materials provide several significant advantages. The fill material can be produced simply by blending waste materials and by-products and typically without the use of valuable and costly additives, such as portland cement, acids, bases, or other commercial chemicals or fertilizers. Thus, the fill materials can be economical to produce and to use. Upon exposure to water, the resulting cured mortars provide environmentally benign long-term pH levels of from about 7 to about 9 and have the surprising property of releasing smaller amounts of heavy metals and environmentally harmful elements as leachates than the components of the mix tested separately.

The wastes and by-products that are selected for combination into one of the novel fill materials can be blended in either a wet or dry form. In a dry form, the combination of wastes and by-products will be referred to herein as a "mix". Water can be added to the mix to form a "mortar". This mortar can then be transferred—in paste, liquid, or slurry form—to the desired final location for the fill material and permitted to stabilize and cure. The cured mortar provides the stable fill material of the present invention.

As used herein, the term "stabilize" means that components of the mortar react to form chemical compounds that are more stable than the reactants under the environmental conditions typically encountered by an earth-contact fill material. Compounds that are "more stable" are compounds that result in lower levels of leaching of toxic and heavy metals, such as boron, chromium and lead, than compounds with which they are compared, when tested in, for example, the ASTM D-3987 leaching test. "Stabilized" fill materials, as those terms are used herein, mean fill materials that are more stable than the components from which they are made.

The terms "unacceptable leaching" as used herein, mean the leaching of one or more toxic and/or heavy metals from a test material in, for example, an ASTM D-3987 leaching test, at levels that are higher than the groundwater standards for Class IV areas. However, it is preferred that the leaching of such materials is maintained at a level that is lower than the Class III standards, more preferred that such levels are lower than the Class II standards, and even more preferred that such levels are lower than the Class I standards.

Coal processing waste (CPW) is a component of the mixes and mortars of the present invention. As used herein, the phrase "coal processing waste" is meant to include coal of any size and from any source that is either not suitable for use, or has not been used for its primary purpose—usually combustion. The phrase "waste coal" is used herein to mean such coal. The coal processing waste that is preferred for use in the present invention, however, is that waste material that is a by-product of processing plants that process (i.e., crush, grind, wash, screen, etc.) run-of-mine coal to produce market-quality coal. The CPW can be coarse (generally larger than about 0.25 inch nominal diameter), or may be fine (smaller than about 0.25 inch nominal diameter). The CPW's are useable in dry form, and are often available in dry form or as aqueous slurries. The CPW can be used as-is in slurry form, but it is sometimes desirable to de-water the slurry to some degree in order to limit and control the amount of water that is added to the novel mortars of the present invention (as will be discussed in detail below).

The CPW's that are useful in the novel mixes and mortars can be characterized as having a sulfur content, which can be measured by any quantitative test for sulfur in coal—such as, for example, by the ASTM (American Society for Testing and Materials) method ASTM D-3177. Once the sulfur content of the CPW is measured, the "acid potential" of the CPW can be estimated by assuming that all of the sulfur in the CPW is present as pyritic sulfur (that is, as the $FeS_2$ form of sulfur), and then calculating the maximum net amount of acid that such amount of pyritic sulfur would produce by reaction with oxygen and water under conditions that were ideal for acid production from pyritic sulfur compounds. The "acid potential" is the maximum amount of acid that could be produced from a given weight of a CPW, if all of the sulfur in the CPW were present as pyritic sulfur, less the amount of such acid that would be neutralized by calcium oxide, calcium carbonate, or any other basic materials that are present in the CPW.

It is important to measure the acid potential of the CPW, so that other suitable components of the novel mix can be selected in order to provide a fill material that has the advantage of avoiding acid leaching. The type and selection criteria for such other materials is described below.

Another component of the novel mixes and mortars of the present invention is a coal combustion byproduct (CCB). As those terms are used herein, "coal combustion by-products" are those materials that remain as residues from the combustion of coal. They include, without limitation, fly-ash of all types, bottom ash and scrubber sludges. CCB's that may be used in the present invention may be dry, such as, for example, fly ash from bag houses and precipitators, or they can be wet, such as ponded fly ash and scrubber sludge.

The coal combustion by-products that are useful in the present invention can be characterized as having an "acid-neutralizing potential" (also termed "base potential"), which terms are to be understood to mean the calcium carbonate equivalent (CCE) of the material as measured by the Ag-Lime test (American Society of Testing and Materials (ASTM) test method number C-602). In general, the CCE is a measure of the capacity of the materials to neutralize acids. This property of the coal combustion by-product has been found to be useful in neutralizing the acids that are present in, or can form from, coal processing wastes upon their exposure to normal environmental conditions. CCB's that have calcium carbonate equivalent values that are above about 11% (as measured by the Ag-Lime test of ASTM Method No. C-602) and/or a paste pH value of above about 8.0 (as measured by the paste pH test of ASTM Method D-4972), can also serve as the "alkaline by-product" (as those terms are defined below) of the subject mixes and mortars.

Examples of the CCB's that can be used in the subject mixes and mortars are fluidized bed combustion (FBC) ashes, F-type fly ash, C-type fly ash, ponded fly ash, bottom ash, sulfate-, or sulfite-rich scrubber sludge, and fly ash stabilized scrubber sludge, among others.

Class F fly ash is defined as fly ash normally produced from burning anthracite or bituminous coal and which meets the ASTM requirements for this class (ASTM C-618, Class F). The composition of typical Class F fly ashes from two different commercial coal burning power plants is shown in Table 1.

TABLE 1

Selected properties and composition of Class F fly ash from two commercial power plant sources.

| PARAMETER | UNITS | Power Plant "S" | Power Plant "A" |
|---|---|---|---|
| Mean particle size | mm | 0.022 | 0.028 |
| Bulk density | lbs/cu. ft. | 59.9 | 52.6 |
| $SiO_2$[a] | % by weight | 40.99 | 48.48 |
| $Al_2O_3$ | % by weight | 15.73 | 20.06 |
| $Fe_2O_3$ | % by weight | 22.15 | 17.63 |
| CaO | % by weight | 4.31 | 3.30 |
| $Na_2O$ | % by weight | 0.70 | 0.53 |
| MgO | % by weight | 0.57 | 0.48 |
| $SO_3$ | % by weight | 2.57 | 0.76 |
| $K_2O$ | % by weight | 3.43 | 2.11 |
| $Mn_2O_3$ | % by weight | 0.15 | 0.11 |
| $P_2O_5$ | % by weight | 1.21 | 0.28 |
| $TiO_2$ | % by weight | 1.08 | 1.02 |

Notes:
a. The amounts of oxides were determined by X-Ray Fluorescence analysis.

Some Class F fly ashes are typically highly acidic when they are first mixed with water—reaching a pH of about 3. However, over a period of about 2 to 16 hours, the pH slowly increases to about 8. Class F fly ash typically has lower levels of CCE values than, for example, Class C fly ash. As long as the Class F fly ash is of the type that is useful in the subject mix and mortar (i.e., is of the type having an acid neutralizing potential), it has been found that there is no need for further treatment or preparation of the ash prior to its use.

Fluidized bed combustion (FBC) ash that is useful in the present invention is typically produced by a fluidized bed combuster type of coal furnace. The unique composition of FBC ash is due in part to the typical practice of performing desulfuirization inside the furnace by burning the coal in the presence of a calcium-containing material, such as limestone (calcium carbonate). The ash that is generated by the combustion is carried upward by a stream of rising hot gas and a major portion of the ash is conveyed out of the furnace with the exhaust gas. In the furnace, the calcium carbonate is oxidized to calcium oxide, some of which subsequently reacts with the sulfur from the coal to form calcium sulfate or calcium sulfite. The calcium sulfate or sulfite and calcium oxide, along with other non-volatile components of the coal and limestone, collects in the FBC ash. This combustion process also results in the generation of spent-bed ash material (which is similar to bottom ash). The spent-bed ash typically has a reasonably high CCE value and may be a suitable coal combustion byproduct in the novel mix.

Desulfurization processes that act upon hot gases as they exit the furnace can also produce ash that is useful in the present invention and, for the purposes of this invention, can be considered to be the equivalent of FBC ash. By way of example, the ash that is produced by flue gas hot scrubbing processes is also useful as the CCB of the invention. In one typical hot scrubbing process, fine particles of lime or limestone are dispersed in water. This slurry is sprayed in fine droplets into a chamber through which the hot exhaust gases are flowing. The lime or limestone particles react with the sulfur compounds in the hot flue gas to form calcium sulfate that is deposited upon, or collected along with the fly ash from the scrubber.

Selected properties and components of an FBC fly ash that has been found to be useful in the subject invention are shown in Table 2. These values are provided by way of example only and it would be expected that other FBC ashes that would also be useful in the subject invention would have somewhat different properties and components. It is common for FBC ash to have higher levels of calcium oxide than, for example, Class F fly ash.

TABLE 2

Properties of fluidized bed combustion fly ash from Power Plant "U".

| PARAMETER | UNITS | VALUE |
| --- | --- | --- |
| Mean particle size | mm | 0.17 |
| Bulk density | lbs/cu. ft. | 42.4 |
| $SiO_2$[a] | % by weight | 36.10 |
| $Al_2O_3$ | % by weight | 13.89 |
| $Fe_2O_3$ | % by weight | 11.08 |
| CaO | % by weight | 18.0 |
| $Na_2O$ | % by weight | 0.55 |
| MgO | % by weight | 0.43 |
| $SO_3$ | % by weight | 8.23 |
| $K_2O$ | % by weight | 1.44 |
| $Mn_2O_3$ | % by weight | 0.08 |
| $P_2O_5$ | % by weight | 0.40 |
| $TiO_2$ | % by weight | 0.40 |

Notes:
a. The amount of oxides were determined by X-Ray Fluorescense analysis.

It is well known that the components and even the physical characteristics of Class C fly ash, Class F fly ash and FBC ash from different sources and different coals can vary widely. The two examples of Class F fly ash and the example of FBC ash that are described above, are provided by way of example only and are not to be interpreted as limiting. Other Class F fly ashes and FBC ashes that fall generally within these broad classifications can also be used in the present invention. The inventor does not believe that either Class C fly ash, Class F fly ash or FBC ash must conform exactly to the ASTM requirements defining such classes, but believes that ashes that largely conform to the ASTM definitions, but deviate in certain respects, can also be advantageously used.

When a coal processing waste is blended with a coal combustion by-product that has a CCE value under about 11% (by the Ag-Lime test of ASTM Method No. C-602) and a paste pH value of under about 8.0 (by the paste pH test of ASTM Method D-4972), it is believed to be necessary to add a separate neutralizing/stabilizing by-product to the mix or mortar in order to obtain a balance between the acid potential and the base potential of the various components. However, it should be understood that some CCB's when used alone (with the CPW) provide sufficient neutralizing and stabilizing properties without the use of an additional neutralizing/stabilizing by-product. In those instances, it is said that the CCB "is the same as" the neutralizing/stabilizing by-product.

As those terms are used herein, "neutralizing/stabilizing by-product" is meant to include materials that occur as by-products, or secondary products, in industrial processing operations, and which have a CCE value of above about 11% and/or a paste pH value of above about 8.0. Such neutralizing/stabilizing by-products may also be referred to herein as "alkaline by-products", or as an "N/SB". Preferably, the N/SB is a material that is itself a waste, or presents a potential environmental problem or cost for its own disposal. More preferably, the N/SB is a material having a CCE value of above about 25% and/or a paste pH value of above about 8.5, and even more preferably the CCE is above about 50% and/or the paste pH value is above about 9.5, and yet more preferably the CCE is above about 70% and/or the paste pH value is above about 12. As mentioned previously, some CPW's can serve as N/SBs, depending upon the value of their base potential.

Examples of materials that are useful as N/SBs in the present invention include lime, lime wastes, gypsum, gypsum waste, cement kiln dust, waste material from ready-mix plants, waste streams from soda ash plants, and the like.

One example of an N/SB that is useful in the subject mixes and mortars is lime waste that is generated as a by-product in lime processing plants. Such lime waste can occur as a side-stream from scrubbing operations and often is available in the form of a slurry. Lime waste slurry from a typical industrial limestone plant can have a CCE of over 70%, and, in fact, even over 100%, and a paste pH value of 12.0, or more.

The subject mixes and mortars are prepared by intermixing specific amounts of the components that have been selected on the basis of the properties described above. The subject mixes are prepared by intermixing into a mixture a coal processing waste (CPW), having a known acid potential, and a coal combustion by-product (CCB), having a known base potential, in relative proportions sufficient to cause the mixture to have an acid/base potential of 1/1, or less. When the terms "acid/base potential" are used herein in reference to a mix or a mortar, what is meant is the sum of the acid potential value of all of the components in the mixture divided by the sum of the base potential value of all of the components in the mixture. When the mixture has an acid/base potential of 1/1, or less, it is said to have a "balanced acid/base potential".

In order to insure that the long-term pH of any leachate that may be generated by the cured fill materials of the present invention never becomes acidic (below a pH of about 6.0), it is preferred that the components of the mix, and their proportions, be selected so that the acid/base potential is lower than about 1/2; more preferably, lower than about 1/4; even more preferably, lower than about 1/7; and yet more preferably, lower than about 1/10.

As mentioned above, in some instances, the CCB that is selected for the mix does not possess the base potential required to provide the desired acid/base potential. In those cases, the addition of a separate neutralizing/stabilizing by-product, having a higher base potential than the CCB, is required. The mixture of the neutralizing/stabilizing by-product, the CPW and the CCB is designed to attain the same acid/base potential properties as are described above. Since the CPW normally has a relatively high acid potential and a low base potential, it is desirable to add a total amount of the CCB and the neutralizing/stabilizing by-product that is sufficient to provide that the mix has an acid/base potential of 1/1, or less.

It has been found that a useful fill material mix can be prepared when the mix comprises from about 25% to about 60%, CPW and from about 40% to about 70% of the combined CCB and neutralizing/stabilizing by-product—all in percent by weight. It is preferred, however, that the mix comprise from about 30% to about 60%, by weight, CPW and about 40% to about 70%, by weight, of the combined CCB and neutralizing/stabilizing by-product; more preferably, from about 30% to about 45%, by weight, of the CPW and about 55% to about 70%, by weight, of the combined CCB and neutralizing/stabilizing by-product.

When lime waste is the neutralizing/stabilizing by-product, it has been found that the novel fill material mix can be prepared when the combined CCB and neutralizing/stabilizing by-product comprises about two-thirds CCB and about one-third lime waste, in parts by weight.

In instances where no additional neutralizing/stabilizing by-product is required, it has been found that the novel fill material mix can be prepared to contain, by weight, about 30% to about 40% of the CPW; from about 60% to about 70% of a CCB selected from the group consisting of Class F fly ash, Class C fly ash, ponded fly ash, fluidized bed combustion ash, wet scrubber sludge, and mixtures thereof. It has been found that Class C fly ash and FBC ash are more preferred for mixes that are free of additional neutralizing/stabilizing by-product, and most preferred that FBC ash is used as the CCB.

Where lime waste is available, it has been found that the novel fill material mix can be prepared to contain, by weight, from about 30% to about 40% CPW; from about 20% to about 25% of the lime waste; and from about 35% to about 55% of a CCB selected from the group consisting of Class F fly ash, Class C fly ash, ponded fly ash, fluidized bed combustion ash, scrubber sludge, and mixtures thereof.

When the individual components of the mixes of the present invention are dry solids, they can be intermixed by any type of mixer, or mixing technique that is used for the blending of solids. Powder blenders, mills, kneaders, rotating drums, and the like, and even bulk mixing of the components with a back-hoe or a bulldozer can intermix the components. The mix itself can be stored and transported as a dry mixture, if desired.

If one or more of the components of the mix are moist, they can be dried and then intermixed with other dry components as described above.

In many instances, however, most, if not all, of the components of the mix are available in moist form, or even as slurries with water. Coal processing wastes, scrubber sludges, ponded ashes, and lime wastes are commonly found as aqueous slurries. One of the advantages of the novel method is that the ingredients can easily be intermixed when they are moist, or in slurry form. When making a mortar, however, it is believed to be desirable to limit the amount of water relative to the dry components of a mix to an amount that is sufficient for transportation and is appropriate for proper curing of the mixture. When the mix is supplied in dry form, water is simply added to the dry components of the mix in an amount sufficient for transportation and appropriate for proper curing of the mixture. However, when one or more of the components are supplied as a slurry, the moisture content of each slurry must be determined and, in some cases, it is desirable to concentrate, or de-water, the slurry to some degree. For example, coal processing wastes commonly exit the processing plant at a solids level of 10% by weight, or less. Before this material is used to form the subject mortar, it may be desirable to concentrate the solids up to at least about 40% by methods that are well known in the art. The recovered water can be recycled back to the processing plant for re-use, and the concentrated CPW can be used to form the subject mortar. Thus, water can be added to the solid mix components either after they have been blended as dry powders, or it can enter along with the mix components. If necessary, more water can be added during blending of the components to form the mortar.

By whatever means that water is added, a sufficient amount of water—relative to the amount of the dry components of the mix—is required in order to produce a mortar having the desired transportation and curing properties. The transportation properties of a freshly-mixed mortar of the present invention can be characterized by the "slump" of the mortar (as measured by ASTM Method C-143-74), or by the "flow" of the mortar (as measured by the method described below in Example 1). When it is desirable to pump the mortar, for example, it may be necessary to add sufficient water to obtain a mortar having a slump of about 7 inches, or higher. On the other hand, when it is important for the mortar to maintain its poured form, a mortar having a slump of 4 inches, or less; or even 3 inches, or less; may be desirable.

The amount of water that is present in a mortar also affects the curing properties of the mortar. By "curing properties", what is meant is the time required for curing of the mortar and the strength of the mortar that is developed during curing. By "curing", what is meant is the hydration of the calcium oxides and silicates and other minerals in the mortar along with drying of the mortar. Curing of a subject mortar is similar to the curing of, for example, a pozzolanic material, and takes place over a period of time, which can be hours or days, or—in the case of large and thick layers of mortar—even several weeks.

It is known that the water content of a mortar affects the strength of the cured mortar. It is believed that useful mortars can be produced when the water content of the mortar is between about 30% and 50% (based on the total weight of the mortar). It is preferred that the water content of the mortar is between about 32% and 42%; and more preferred that the water content is between about 34% and 42%.

One example of a preferred mortar of the present invention is a mixture comprising from about 30% to about 40% of coal processing waste and from about 60% to about 70% of a coal combustion by-product selected from the group consisting of Class F-fly ash, Class C-fly ash, ponded fly ash, fluidized bed combustion ash, wet scrubber sludge, and mixtures thereof, in percent by weight of the solids, and from about 32% to about 42% of water, in percent by weight of the mixture.

Another example of a preferred mortar is a mixture comprising from about 30% to about 40% of coal processing waste; from about 20% to about 25% lime waste; and from about 35% to about 55% of a coal combustion by-product selected from the group consisting of Class F-fly ash, Class C-fly ash, ponded fly ash, fluidized bed combustion ash, wet scrubber sludge, and mixtures thereof, in percent by weight of the solids, and from about 34% to about 42% of water, in percent by weight of the mixture.

The subject mortar can be mixed by any mixing apparatus or technique suitable for mixing slurries having high levels of solids, such as pastes or concretes. Concrete mixers, ribbon blenders, rotating mills and the like, can be used to mix the mortar, as well as batch mixing in a pit with, for example, a back-hoe, drag line, or other similar equipment.

If the mortar is not mixed at the location where the fill material is ultimately desired, the mortar can be transported to such site by pumping or by truck, cart, or rail car. In cases where only a limited amount of the fill material is required, a concrete truck can be used advantageously, but where large amounts of the fill material are to be placed, pumping—such as with a concrete pump—is more useful.

When the mortar is placed in the desired location, it is permitted to cure. Commonly, this is done by exposing the mortar to the natural environment of the location of the fill. The cured mortar is the stable fill material of the present invention.

When it is said that the fill material is "stable", it is meant that the cured fill material of the present invention will not change or degrade significantly in the natural environment over time to become the source of acid leachates or leachates containing harmful levels of heavy metals or toxic elements. By the terms "over time", it is meant is a period of at least about one year; preferably about two years; more preferably about five years; and even more preferably about 10 years, or even longer. When it is said that the fill materials do not "degrade significantly", what is meant is that the leaching rate of, for example, boron, from such material does not change more than 25% from its initial leach rate, over the time described. It is preferable that such leaching rate changes less than 20%, more preferable that it changes less than 10%.

In particular, it is believed that the present fill material significantly reduces the levels of potentially harmful metals that would be leached from a like amount of the ingredients of the fill material, if they had not been blended into a mix or mortar of the present invention. In particular, it is believed that the level of boron leachate is significantly reduced by the novel method.

Without wishing to be limited to this, or any other theory, it is believed the reduction in boron leaching is related to pozzolanic reactions in the mortars that either physically isolate boron-rich phases, or that boron-bearing phases are chemically transformed during curing of the mortar into materials that are less capable of boron release.

It is believed that the degree to which a mix can support such reactions is related to the CCE for the mix. It is also believed that the carbonate equivalents in the mix react over time to neutralize acids that are either present in the mix initially, or form in the mix or mortar over time due to redox reactions of the components—principally of the pyritic sulfur. Thus, it is believed that the tendency of a mix to remain environmentally benign over time can be measured (and, thus, controlled) by measuring (and controlling) the total CCE for the mix and measuring (and controlling) the total amount of sulfur in the mix. The objective is to provide a mix that has a balanced acid/base potential (as that term is defined herein).

The subject fill material can be used anywhere an environmentally stable fill material is required, and is particularly well-suited for applications such as in-situ filling of underground mines, filling of surface mines, and filling of uneven or disturbed ground. By selecting the appropriate water content for the types and amounts of dry components of the mix, the strength properties of the cured mortar can be controlled to the extent that a mortar can be formulated to produce a fill material that develops a strength of at least about 20 psi (as measured by a pocket penetrometer) within about three days; preferably that develops a strength of at least about 60 psi within about three days; more preferably that develops a strength of at least about 60 psi within about two days. A preferred cured mortar of the present invention can also develop a 28-day strength (as measured by a pocket penetrometer) of at least about 50 psi; more preferably, at least about 150 psi; and even more preferably, at least about 250 psi. In fact, mortars having higher strength can also be developed.

The strength of the cured mortars of the present invention is dependent upon the types and relative amounts of the dry components that are included in the mix, and also upon the amount of water that is used to make the mortar. With the knowledge that, in general, the higher the moisture level of the mortar, the lower the strength of the cured mortar, and also with the knowledge provided in Example 1, below, about the effect that the amounts and types of dry components has upon strength, one of ordinary skill can easily formulate a mortar having the desired strength properties. If necessary, a simple test can be run as described in the examples, which follow, wherein the mix components are blended with various levels of water and cured, and the strength of the cured mortars are then correlated with the water level of the mortar. The water level that will provide a cured mortar having the desired strength can then be selected.

The preferred cured mortar also has a 28-day density of between about 65 pounds per cubic foot (pcf) and about 80 pcf.

By selecting the components and composition of the mortar so that strength properties are controlled within the lower range of those listed above, a fill material can be produced that has significant moisture-retention capacity and can even be tilled and used to support plant growth. With these properties, the novel fill material can be used advantageously as at least a part of a surface fill material for the remediation of disturbed areas.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE 1

This example illustrates the production and properties of the novel mix and mortar using different combinations of coal processing waste, coal combustion by-products and lime waste.

Coal processing wastes and coal combustion by-products were obtained from different commercial coal processing plants and coal-burning power plants. Lime waste was obtained from a commercial lime processing plant. The ingredients that were used to produce the mixtures are described below:

Coal Processing Waste

Coal Slurry "A": A fine coal processing waste (FCPW) slurry that was obtained from commercial Midwest coal processing plant "A". The slurry had a mean particle size of 18.6 microns and had Atterberg plastic and liquid limits of 26.6% and 57%, respectively and the plasticity index (the difference between the liquid and plastic limits) was 30.4%. Atterberg's limits (liquid and plastic limits) were determined using the standard ASTM D-4318 test protocol. The material had 1.4% sulfur, but no pyritic sulfur was found. Total sulfur content was determined by ASTM Method D-3177.

Coal Slurry "B": A fine coal processing waste (FCPW) slurry that was obtained from commercial Midwest coal processing plant "B". The slurry had a mean particle size of 23.9 microns and an Atterberg plasticity limit of 7.7% and a liquid limit of 40.7%. The material had 3.75% sulfur, and massive and compact (rather than open) pyrites were present.

Coal Combustion By-product

F-type fly ash "A": F-type fly ash from a cyclone boiler in a commercial Midwest coal-burning power plant "A";

F-type fly ash "B" F-type fly ash from a cyclone boiler commercial Midwest coal-burning power plant "B";

Fluidized bed combustion fly ash from a commercial Midwest coal-burning power plant "C";

Fly ash "D" F-type fly ash from a pulverized coal combustion (PCC) boiler in a commercial Midwest coal-burning power plant "D";

Fly ash "A-P" (ponded): Ponded fly ash from a commercial Midwest coal burning power plant "A";

Fixated sludge "A", or Scrubber sludge "A": A fly ash-stabilized dual alkali wet scrubber sludge (sludge:fly ash:lime ratio=22:22:1) obtained from a commercial Midwest coal-burning power plant "A"; and Scrubber sludge "B": Forced oxidized wet scrubber sludge obtained from a commercial Midwest coal-burning power plant "B".

Lime Waste

Lime waste was obtained from a limestone processing plant in the form of a highly alkaline wet sludge from a venturi scrubber.

Selected properties of the various components listed above were measured and characterized as follows. Some of the same tests were used to characterize the properties of mixes of the components.

Particle size analysis and Atterberg's limits tests were conducted on all of the components except the ponded fly ash. Particle size analysis was performed using a Microtrac laser-based particle size analyzer. Atterberg's limits were determined using the standard ASTM D-4318 test protocol. Particle size distribution and Atterberg's limits for the test materials are shown in Table 3.

TABLE 3

Particle size distribution and Atterberg's limits for selected coal processing wastes, coal combustion by-products and alkaline by-products

| MATERIAL[a] | $D_{10}$[b] ($\mu$) | $D_{30}$ ($\mu$) | $D_{50}$ ($\mu$) | $D_{60}$ ($\mu$) | P[c] (%) | LL[d] (%) | PL[e] (%) | PI[f] (%) |
|---|---|---|---|---|---|---|---|---|
| CS-A | 2.8 | 9 | 18.6 | 19.2 | 6 | 57 | 26.6 | 30.4 |
| CS-B | 7 | 13 | 23.9 | 32 | 1.2 | 40.7 | 33 | 7.7 |
| FA-A | 8.1 | 17 | 34.2 | 38 | 0 | n/a | n/a | NP |
| FA-B | 6 | 17 | 32.6 | 38 | 2.8 | n/a | n/a | NP |
| FA-C | 6 | 16 | 33.2 | 38 | 2 | n/a | n/a | NP |
| FA-D | 5.5 | 15 | 32.1 | 38 | 2.3 | n/a | n/a | NP |
| SS-A | 22 | 29 | 52.6 | 58 | 0 | n/a | n/a | NP |
| SS-B | 22 | 28 | 44.2 | 49 | 0 | n/a | n/a | NP |
| LW | 33 | 28 | 40.9 | 43 | 0 | n/a | n/a | NP |

Notes:
[a]Materials are: Coal Slurry "A" (CS-A); Coal Slurry "B" (CS-B); Fly ash "A" (FA-A); Fly ash "B" (FA-B); Fluidized bed combustion ash (FA-C); Fly ash "D" (FA-D); Scrubber sludge "A" (SS-A); Scrubber sludge "B" (SS-B) and Lime waste (LW);
[b]Particle sizes are reported as particle sizes on the cumulative particle size distribution curve at which 10, 30, 50 and 60 percent of the particles are passing;
[c]P = percentage of material less than $2\mu$ size;
[d]LL = liquid limit; n/a means that the parameter could not be obtained for the material;
[e]PL = plastic limit; n/a means that the parameter could not be obtained for the material; and
[f]PI = plasticity index. NP means non-plastic.

Paste pH of the various materials was obtained by mixing one part (approximately 10 grams) solid with one part (by volume; 10 ml) of distilled water according to the procedure described in ASTM D-4972 and using a pH meter to measure the pH of the paste.

The calcium carbonate equivalent (CCE) value of the materials was determined by the Ag-lime procedure (ASTM C-602).

Paste pH and CCE were determined for all of the materials that are described above and also for the mortars that were to be tested.

The total sulfur content of the two coal slurries was determined using a Leico sulfur analyzer.

The paste pH and CCE values for the materials are shown in FIG. 1. It was noted that fly ash "A" has an acidic paste pH, while the other coal combustion by-products show paste pH values that range from weakly alkaline (pH=8.2) to strongly alkaline (pH=12.6). Although the paste pH values for the coal processing wastes is almost neutral (pH=7.2 and 7.8), it is noteworthy that the pyritic sulfur that is present in many coal slurries can react to form soluble materials that are significantly more acidic.

Figure 2:
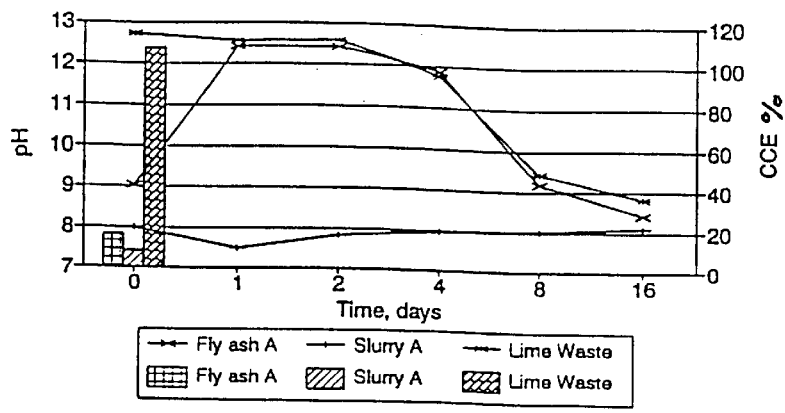
FIG. 2 shows the CCE values of fly ash "A", coal slurry "A" and lime waste, and also shows the variation of paste pH as a function of time over 16 days for the same three components in contact with moisture.

Neither F-type fly ash, nor forced-oxidized scrubber sludge are powerful acid neutralizers. Strong acid neutralization power is restricted to materials with significant calcium oxide or calcium hydroxide content. The high CCE materials also have high initial pH values (around 12), but, as shown in FIG. 2, where longer-term pH stability in a wet, low-temperature environment is measured, these lime-based phases do not persist and the pH values soon return to the 7.5–8.5 range upon the formation of carbonate and sulfate phases. However, the materials have potential to act as acid neutralizers if they are contacted with acid before other neutralization reactions act to reduce their pH, and the milder sulfates and carbonates can neutralize the acid produced from slower, oxidation-based reactions.

It was noted that both coal slurries "A" and "B" had CCE values that were stoichiometrically sufficient to prevent acid mine drainage, even if all of the sulfur detected were in the pyritic form. However, because minerals seldom react in stoichiometric proportions, the conclusion that the coal slurries do not pose an acid drainage risk over the long term is not justified. It is believed that, in particular, coal slurry "B" is border-line and may benefit from the addition of alkali from coal combustion by-products and/or lime waste.

Production, Curing and Testing of Different Mortar Compositions

Mortars of coal slurry, coal combustion by-products and lime waste were prepared in five pound batches with low shear mixing, such as with a ribbon blender, to intermix the components. Coal slurry was completely air dried at room temperature and humidity. Water was added to the coal particles to make a mixture that was 50% moisture content. The water was added to the dried coal in a mixing bowl and allowed to stand for several minutes for complete separation of slurry particles. The lime waste, if called for, was added to the slurry at this time and the slurry was mixed for approximately one minute. Then the coal combustion by-product(s) was slowly introduced to the mixing bowl while continuously mixing at low speed for three to five minutes. Water was added periodically to make a pumpable paste without any bleeding (visible separation of water from the solid particles when allowed to settle). When FBC fly ash (Fly ash "C") was used, it was pre-hydrated with 12% to 15%, by weight, water prior to addition to the mortar.

The moisture content of the paste was determined by weighing and drying and re-weighing 3 samples of 25–40 grams each taken from the mixing bowl.

Samples for curing and testing were prepared for each test mortar by pouring the paste into 3"×6" plastic trays; two- or three-inch diameter cylindrical molds; and two-inch cubical molds with oiled inside walls. Compaction of the samples was done by tapping the outside of the filled molds. The samples were left in the molds for 24 to 48 hours before unmolding. The unmolded samples were then allowed to complete curing at room temperature (20°–25° C.) and humidity (30%–60% RH).

The surface strength of the curing and cured mortars (while in the plastic trays) was determined using a SOILT-EST® Model No. CL-700A pocket penetrometer at intervals of 24 hours until the strength reached more than 60 psi. The surface strength determined in this manner was interpreted to be indicative of the bearing capacity of the material.

Figure 3A:
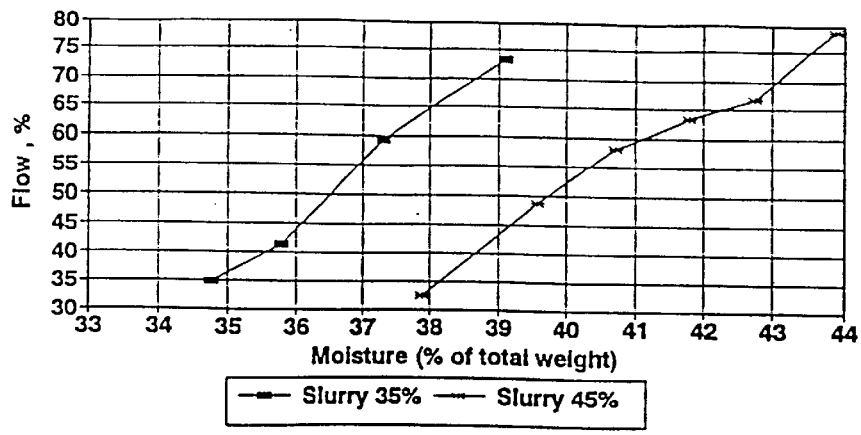
FIG. 3 illustrates the effect of moisture level on the flow (as measured by ASTM test C-87) of mortars according to the present invention, for (a) mortars having two levels of CPW slurry; (b) mortars made with two different types of fly ash; and (c) mortars made with two different types of CPW.

The flow properties of freshly prepared mortars was determined by using a 10" flow table (of the type shown in FIG. 3(a)) and a one-half-size ASTM slump cone mold having a height of 2" and an internal diameter at the top and base of 2.75" and 4", respectively (as described in ASTM standard methods C-143, C-192). The freshly prepared mortar was used to fill the mold, which was then placed in the center of the flow table. The paste was cut off to a plane surface flush with the top of the mold and the mold was lifted away from the paste. The table was then immediately raised to a height of 0.5" and dropped 10 times within six seconds. The diameter of the cone at the base was then measured at four locations that were equally radially spaced around the cone. The average of the four readings was computed and reported as the average diameter after test (in inches). The "flow" of the mortar was calculated as: flow=100×(Avg. diameter after test−4)/4.

Figure 3B:
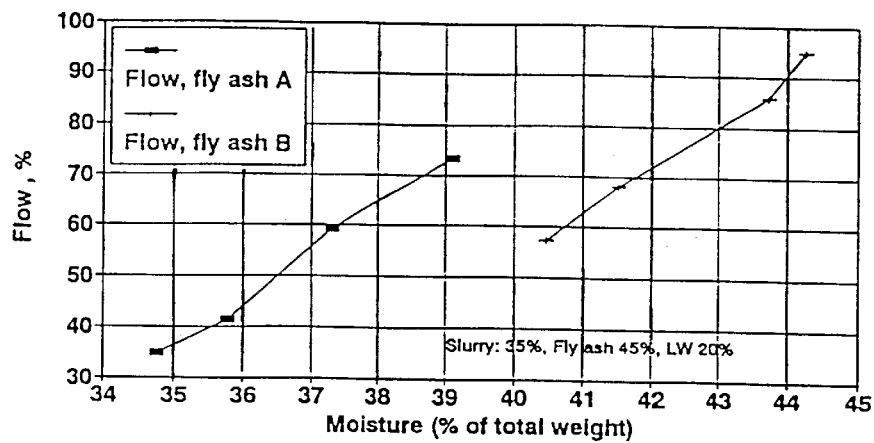
Figure 3C:
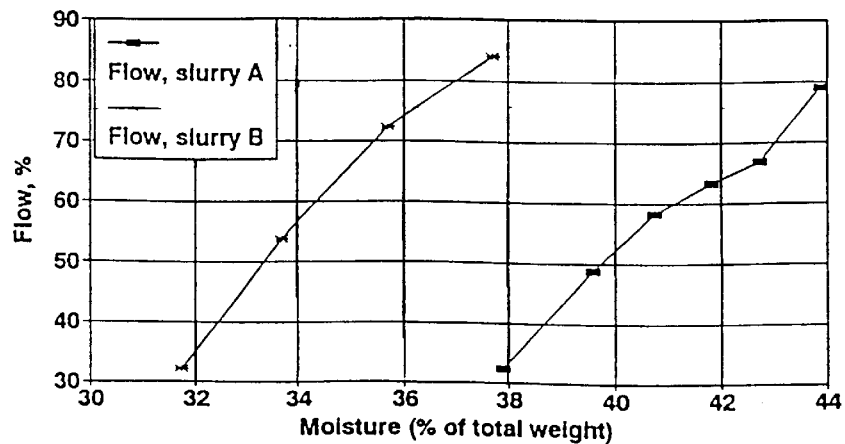

It was found that the flow (and/or slump) of any mortar type was not only a function of the water content of the mortar, but also strongly influenced by proportions and types of coal slurry and fly ash contents. FIGS. 3(a), 3(b), and 3(c) illustrate this conclusion. FIG. 3(a) shows the flow for two mortars of type P1 with 20% lime waste. It was clear that as the coal slurry percent in the mortar increased from 35% to 45%, the amount of water needed to produce the same flow also increased. A 60% flow is obtained with 37.3% moisture and 35% coal slurry "A" (with fly ash "A" and lime waste). The same flow for a mortar with 45% coal slurry is obtained at 42% moisture.

FIG. 3(b) shows a comparison of flow for two mortars (P1 and P2) with coal slurry "A" and fly ashes "A" and "B". The proportions of slurry, fly ash and lime waste in the two mortars are the same. Mix type P2 requires more water than mix type P1 to produce a mortar having the same flow characteristics.

FIG. 3(c) shows the flow of two mortars made with coal slurries "A" and "B". Mixes with slurry "A" require more water to produce a mortar having the same amount of flow than mixes with slurry "B". FIGS. 3(b) and 3(c) show that the flowability of the mortar is affected not only by the amount of coal slurry in the mix, but also the type of coal slurry and the type of fly ash that are used.

The ASTM Slump of the mortar was measured according to ASTM C-143-74). The procedure included pouring the mortar paste into a one-half size standard ASTM slump cone (having internal diameters of 1.5" at the top and 3" at the bottom and having a height of 6"). The cone was then lifted off the material and the drop in height of the paste is measured. Two times the drop in height of the paste is reported as the ASTM Slump (or, "slump").

Bleeding of water from the freshly prepared mortars was determined according to the ASTM C-940 procedure. Briefly stated, this involves placing between 800 and 850 ml of the freshly prepared mortar into a 1000 ml graduated cylinder and placing the cylinder onto a horizontal table. The top of the cylinder was sealed with plastic wrap to prevent evaporation. The level of the mortar was read immediately upon placing the cylinder on the table and the top of the level of the settling solids is read every 15 min. during the first hour and every hour thereafter until two successive readings are the same. The clear water that gathers over the top of the solids layer is removed and the volume is measured and reported as a percentage of the initial volume of the mortar. That percentage is reported as the "Bleed".

The density of freshly prepared mortar was determined by filling a 3"×6" cylinder with the mortar and measuring the weight of the filled cylinders to the nearest one-hundredth of a pound. The density was calculated and reported as pounds per cubic foot (pcf).

Several properties of the cured mortars were measured. Among these were the density, which was calculated from the weight and known geometry of the sample; and paste pH; long-term pH stability; and elemental analysis of ASTM shake-test leachates, which will be discussed below.

Tables 4 and 5 show eight types of mixes and mortars (four using coal slurry "A" and four using coal slurry "B") with ranges of the amounts of different coal combustion by-products and lime waste for each type of mix investigated. The purpose of the test was to determine how geotechnical and environmental properties of fresh and cured mortars were affected by the types of waste materials and by-products used to formulate the mortar and the composition of the mortar.

TABLE 4

Ranges of proportions of different coal combustion by-products and lime waste used to formulate mixes and mortars with coal slurry "A"

| MIX TYPE | COAL SLURRY "A" (%) | FLY ASH "A" (%) | FLY ASH A–P (%) | FLY ASH "B" (%) | SCRUBBER SLUDGE "A" | LIME WASTE (%) | WATER (%)[a] |
|---|---|---|---|---|---|---|---|
| P1 | 35–55 | 30–63 | | | | 2–33 | 30–40 |
| P2 | 36–55 | | | 25–55 | | 10–20 | 35–41 |
| P3 | 30–35 | | | | 30–45 | 20–40 | 35–42 |
| P4 | 35–40 | | 40–45 | | | 20 | 36–40 |

Notes:
[a]All proportions are in percent of total solids by weight except for water, which is reported in percentage of total mixture.

TABLE 5

Ranges of proportions of different coal combustion by-products and lime waste used to formulate mixes and mortars with coal slurry "B"

| MIX TYPE | COAL SLURRY "B" (%) | FLY ASH "C" (%) | FLY ASH D (%) | SCRUBBER SLUDGE "B" | LIME WASTE (%) | WATER (%)[a] |
|---|---|---|---|---|---|---|
| F1 | 40–60 | 40–60 | | | | 31–35 |
| F2 | 30 | | 20–30 | 20 | 20–30 | 34–37 |
| F3 | 30 | 20–30 | 20–30 | 20 | | 31–34 |
| F4 | 30–40 | 20–40 | | 30–40 | | 31–34 |

Notes:
[a]All proportions are in percent of total solids by weight except for water, which is reported in percentage of total mixture.

TABLE 6

Selected geotechnical properties of the fresh mortars made from the eight mix types described in Tables 4 and 5

| MIX TYPE | TIME (Days)[a] | COMPRESSIVE STRENGTH (psi) | ELASTIC MODULUS (kpsi) | DENSITY (pcf) | SLUMP (in) |
|---|---|---|---|---|---|
| P1 | 2–5 | 270–430 | 8–15 | 73–82 | 0–7 |
| P2 | 2–5 | 270–360 | 7–14 | 70–84 | 0–7 |
| P3 | 3–4 | 260–300 | 7–13 | 64–68 | 2–6 |
| P4 | 4–5 | 180–230 | 5–7 | 74–78 | 0–7 |
| F1 | 1–3 | 160–240 | 4–11 | 69–78 | 2–6 |
| F2 | 2–3 | 123–132 | 2–6 | 74–77 | — |
| F3 | 1–3 | 130–230 | 2–7 | 81–82 | 2–6 |
| F4 | 1–3 | 103–170 | 2–3 | 74–75 | 2–9 |

Notes:
[a]Number of days to attain 60 psi strength as measured by a penetrometer.

Table 6 indicates that mortars made with ponded fly ash (P4 mixes) have low short-term strength compared to the mortars made with fresh fly ash (P1 mixes). The P4 mortars took 4–5 days to reach a strength of more than 60 psi. FBC-based mortars (F1, F3, F4) attain more than 60 psi strength in 1–3 days. In contrast to that, mortars made with lime waste-based mixes (P1 to P4 and F2) take 2–5 days to attain a strength of at least 60 psi.

A model was formulated that predicted the effect of various components on the short-term strength of the mortars:

$$\ln(s) = k_1 + k_2 W/(f + a^{k_3})$$

where ln(s) is the natural logarithm of strength (in psi), f, a and W are the respective contents (in percent of the total mixture) of fly ash, lime waste and water. Regression analysis of strength measured at 48 hours was used to compute the best fit constants.

For P1 mixes, the equation could explain 63% of the variability when $k_1 = 5.45$; $k_2 = -5.03$ and $k_3 = 1.69$. For P2 mixes, the equation could explain 85% of the variability in strength when $k_1$, $k_2$ and $k_3$ were, respectively, 5.5, −1.7 and 0.7. For P3 mixes, $k_1$ and $k_2$ were=1 and $k_3 = 2.39$.

For mortars made with F1 mixes, the strength influencing factor was the ratio of water to fly ash. For the mortar to attain a strength of more than 60 psi within 24 hours, the weight ratio of water to FBC fly ash percentages should be less than 1. Mortars made with mix type F3, with 20%–30% FBC fly ash and approximately 31% moisture took two days to achieve more than 60 psi surface strength. When moisture content was increased to 34%, it took 3 days to attain the same strength. It appeared that changing the F-type fly ash proportions in the 20%–30% range did not affect the short-term strength.

When the ratio of water to FBC fly ash percentages in mortars made with mix type F4 is less than 1.3, a strength of more than 60 psi is attained in one day. The 24-hour curing strengths for mortars with ratio of water to FBC fly ash percentages of 1.7 and 2.5 were 52 psi and 25 psi, respectively.

Figure 4A:
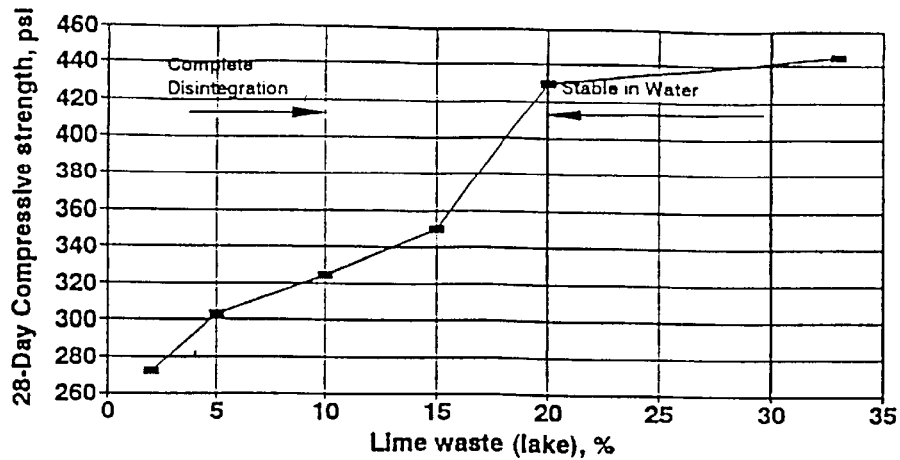
FIG. 4 illustrates the 28-day compressive strength of cured mortars of the present invention, where (a) and (b) show the effect on the strength of P1-type mixes of varying the lime waste and the coal slurry content, respectively; (c) shows the effect on strength of varying the coal slurry amount and the lime waste amount for mix type P2; (d) shows the effect on strength of varying fixated scrubber sludge content and lime waste content in mix type P3; (e) shows the effect on strength of varying the coal slurry content in mix type F1; (f) shows the effect on strength of varying the fly ash content on mix types F2 and F3, and also shows the effect of replacing FBC fly ash with lime waste; (g) shows the effect on strength of increasing the fly ash/scrubber sludge ratio for F3 mix types; and (h) shows the effect on strength of varying the fly ash content in F4 mix types.

Samples that had been cured for 28 days were tested for uniaxial compressive strength in a MTS closed-loop shift loading machine according to the method described in ASTM D-2938-86. FIG. 4 shows the 28-day compressive strength for the mortars of Tables 4 and 5, but with certain of the components varied over their normal ranges. FIG. 4(a) shows the 28-day compressive strength for mortars made with mix type P1 with 35% slurry "A" and varying amounts of fly ash "A" and lime waste. An increase in the lime waste content between 5% and 15% caused a regular increase in strength to 350 psi for a mix with 15% lime waste, and further increased to over 400 psi when lime waste content was increased to 20%. However, a further increase of lime waste did not significantly increase the 28-day strength. All mixes containing less than 20% lime waste appeared to be unstable when submerged in water.

Figure 4B:
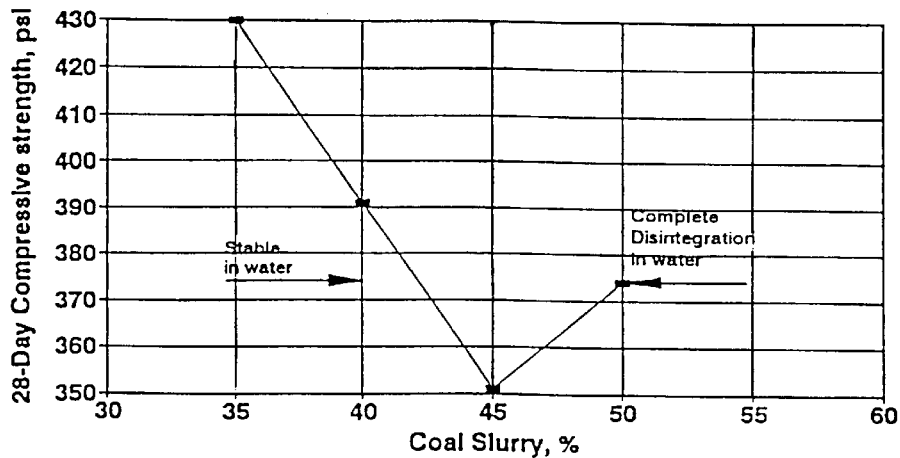

FIG. 4b shows the effect of the level of CPW slurry on the 28-day strength for mix type P1. In general, increasing the amount of the CPW slurry decreases the strength. The figure also shows that when coal slurry comprises more than 40%, by weight of the mix, the stability of the cured mortar appears to deteriorate. Considering strength and water stability, it is preferred that a mix of type P1 contains at least 20% lime waste and no more than 40% coal slurry, by weight.

Figure 4C:
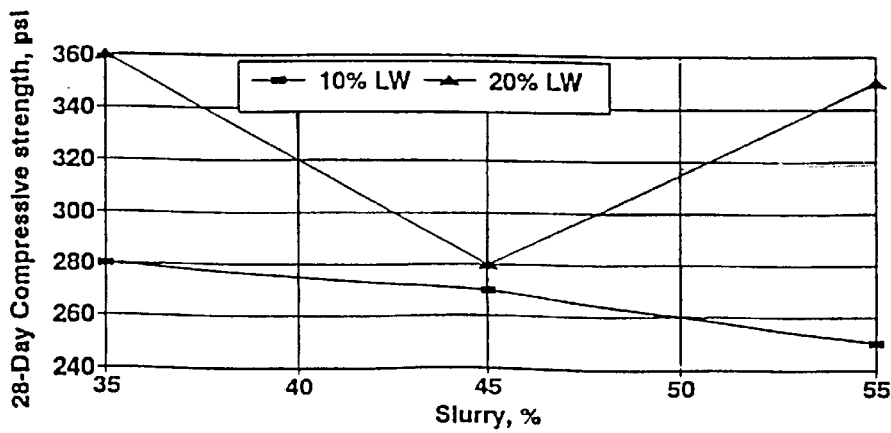

FIG. 4(c) shows the effect of lime waste and coal slurry on strength for mix type P2. The strength increase is significant when lime waste content is increased from 10% to 20%, by weight, except for the mix with 45% coal slurry. However, to obtain more than 300 psi strength, the lime waste content must be at least 20%. A P2-type mix with 35% coal slurry, 45% fly ash and 20% lime waste, solids on a dry basis, appeared to have good geotechnical properties.

Figure 4D:
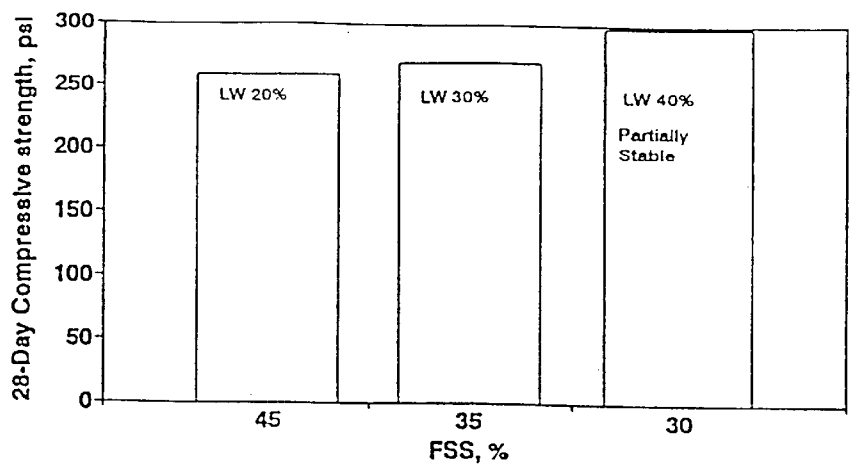

FIG. 4(d) shows the effect of lime waste and fixated scrubber sludge (FSS) on the strength of mix type P3. An increase in the lime waste content from 20% to 40%, and decreasing the FSS content from 45% to 30% did not significantly affect the strength. However, a mix with 40% lime waste appeared to be partially stable in water.

Figure 4E:
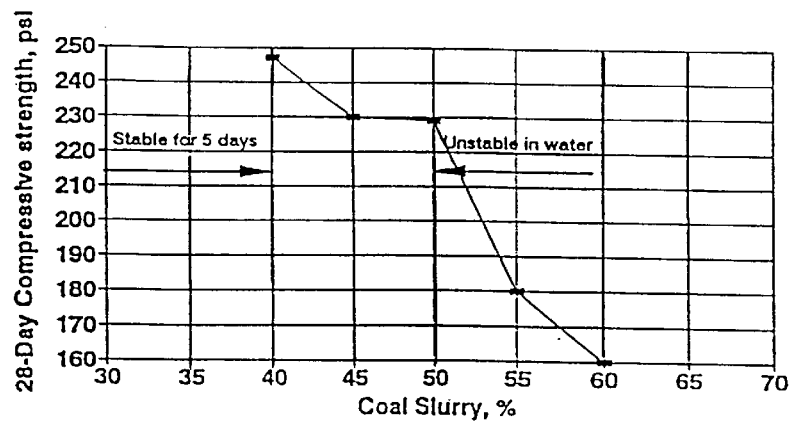

The 28-day curing strength for mix type F1, with coal slurry "B" and FBC fly ash is shown in FIG. 4(e). As with P1-type mixes, an increase in the amount of coal slurry resulted in a decrease in strength that was significant when the coal slurry content exceeded about 50% by weight. Also, at about 50% coal slurry content, the cured mortar appeared to be unstable in water. At 40% coal slurry, the mortar appeared to be stable for about 5 days.

Figure 4F:
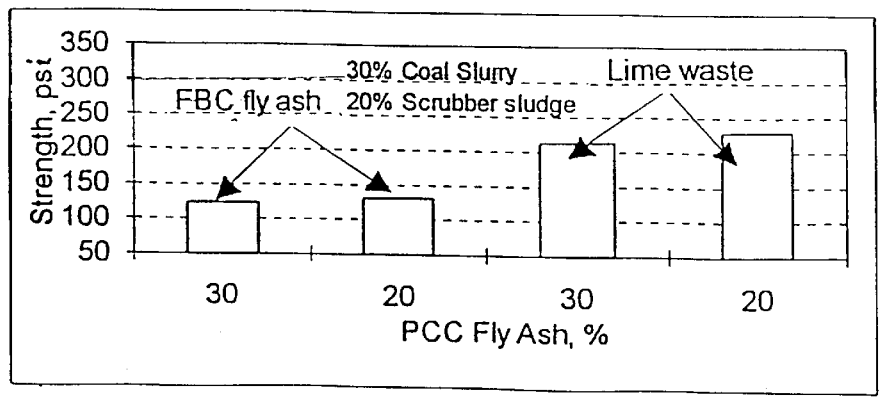

Scrubber sludge-based mixes (mix types F2, F3 and F4) with coal slurry "B" exhibited low strength. FIG. 4(f) shows a comparison of the 28-day strength of mix types F2 and F3 with different proportions of PCC F-type fly ash. Strength increased substantially when the FBC fly-ash is replaced by lime waste.

Figure 4G:
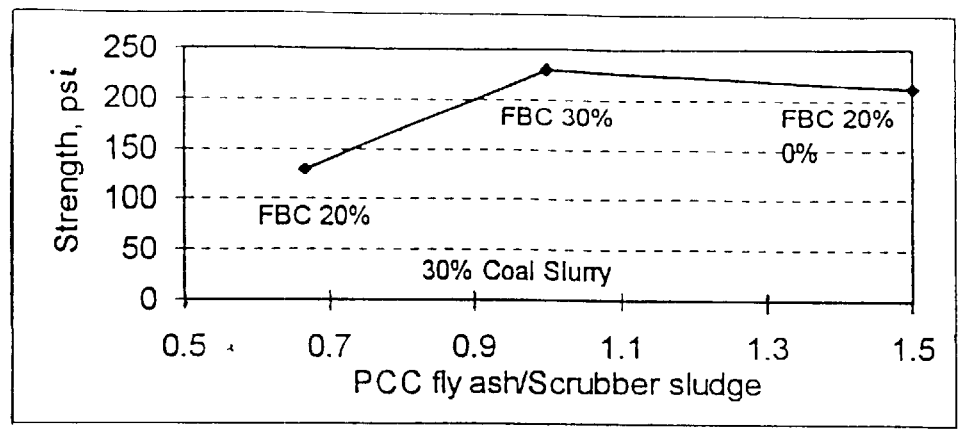

FIG. 4(g) shows the 28-day strength of mix type F3 for different PCC F-type fly ash/scrubber sludge ratios. Increasing the ratio of PCC fly ash/scrubber sludge increased the strength substantially. A linear interpolation of the graph for a mix having 20% FBC fly ash and a fly ash/scrubber sludge ratio of 1.0 is about 160 psi; and with 30% FBC fly ash and a fly ash/scrubber sludge ratio of 1.0 is about 230 psi. This indicated that increasing the amount of fly ash from 20% to 30% substantially increased the strength of the cured mortar.

Figure 4H:
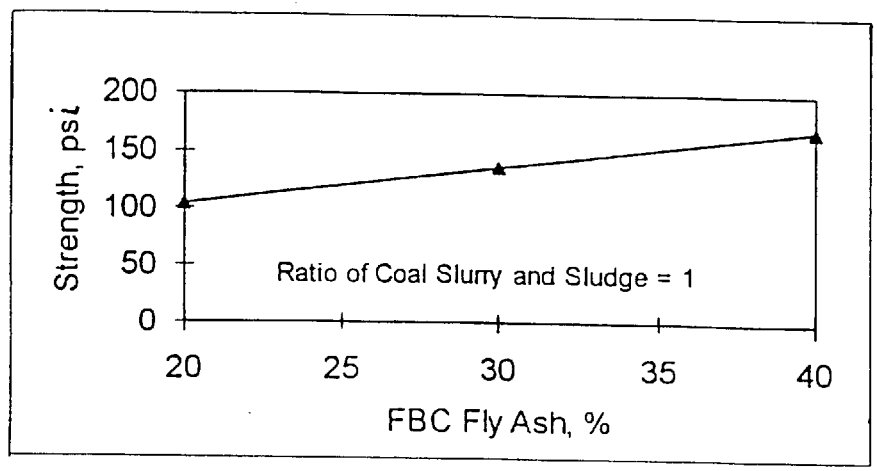

Three combinations of mix type F4, without any PCC F-type fly ash were investigated. The amount of scrubber sludge and coal slurry were each increased from 20% to 40%, by weight. FIG. 4(h) shows the 28-day strength for the mixes with different levels of scrubber sludge, but all with a coal slurry/scrubber sludge ratio of 1.0. Approximately 160 psi strength was obtained for the mix having 40% sludge and coal slurry.

EXAMPLE 2

This example illustrates the formulation of selected mixes and mortars having superior qualities as stable fill materials, where the mixes include coal processing wastes, coal combustion by-products and, optionally, alkaline by-product materials.

Based on the geotechnical and environmental properties of the mortars and cured mortars made from the mixes tested in Example 1—such as, short-term and 28-day strength properties, leaching characteristics and acid neutralization potential—six different compositions for mixes were selected for further testing and large-scale demonstration. In addition, one mix of the P4 type (containing ponded fly ash) was also selected for further testing. The compositions of each of the selected mixes is shown in Table 7.

Mortars of each of the seven selected mix formulations were prepared and tested as described in Example 1. Each mix was blended with sufficient water to provide a mortar having a slump of 6". No bleeding was observed for any of the mortars.

Figure 5A:
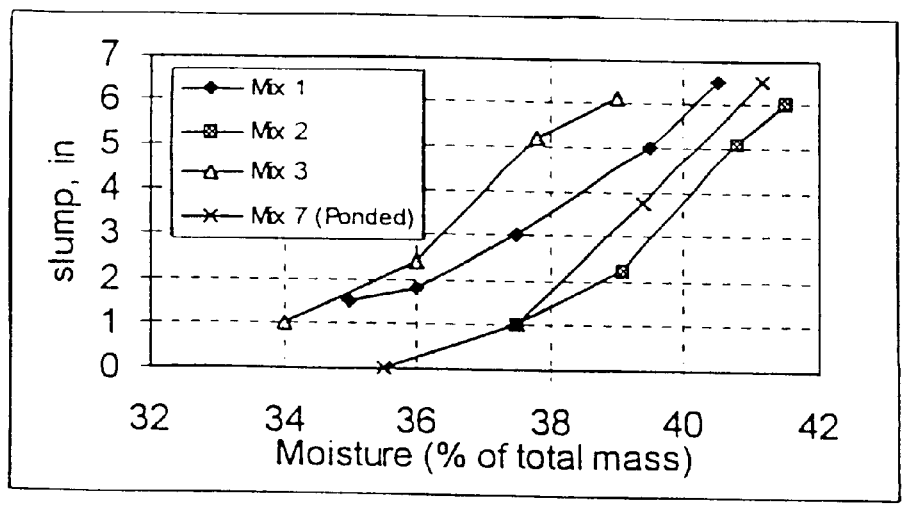
FIG. 5 shows the slump of fresh mortars (measured according to ASTM C-143-74) as a function of the moisture content of the mortars for mix types (a) 1, 2, 3 and 7, and (b) 4, 5 and 6, as described in Table 7.
Figure 5B:
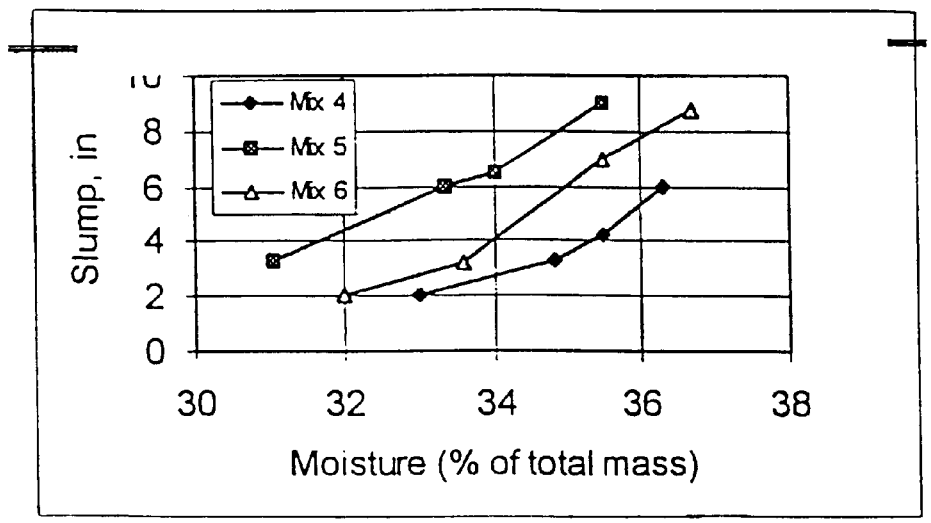

The same mortar formulations were prepared as shown in Table 7, except the amount of water was varied and the ASTM slump was measured. FIGS. 5(a) and 5(b) show the variation in slump caused by changes in the amount of water added to each mix formulation. This illustrates the flexibility in formulating a mortar that requires a certain level of flowability. For example, if the mortar must be pumped a long distance, more water could be used, but it is important to stay within certain limits to insure that the mortar cures into a material having the desired strength and leaching properties. Table 8 shows characteristic density, strength and calcium carbonate equivalent properties for 6"-slump mortars of each of the seven selected mixes.

TABLE 7

Compositions of selected mixes and mortars for fill materials

| MIX ID | COAL SLURRY "A" (%) | FLY ASH "A" (%) | FLY ASH "B" (%) | SLUDGE "A" (%) | LIME WASTE (%) | WATER (%)[a] |
|---|---|---|---|---|---|---|
| 1 | 40 | 40 | | | 20 | 40 |
| 2 | 35 | | 45 | | 20 | 42 |
| 3 | 30 | | | 30 | 40 | 39 |
| 4 | 35 | 45[b] | | | 20 | 41 |

| MIX ID | COAL SLURRY "B" (%) | FLY ASH "C" (%) | FLY ASH "D" (%) | SLUDGE "B" (%) | LIME WASTE (%) | WATER (%)[a] |
|---|---|---|---|---|---|---|
| 5 | 40 | 60 | | | | 37 |
| 6 | 30 | 30 | 20 | 20 | | 34 |
| 7 | 30 | 40 | | 30 | | 35 |

Notes:
[a] All percentages for solid components are given as percent of solids, but percentage of water is calculated as percent of total mixture. The water amounts given in the table are for mortars having a slump of 6".
[b] Ponded fly ash "A–P".

TABLE 8

Selected properties of mortars and cured mortars produced from the seven selected mixes

| MIX ID | WET DENSITY (pcf) | DAYS TO DEVELOP 60 psi STRENGTH | 28-DAY STRENGTH (psi) | 28-DAY DENSITY (pcf) | CCE[a] |
|---|---|---|---|---|---|
| 1 | 92 | 3 | 390 | 77 | 26 |
| 2 | 91.6 | 3 | 360 | 74 | 28 |
| 3 | 90.4 | 3 | 300 | 68 | 53 |
| 4 | 92 | 5 | 230 | 77 | 26 |
| 5 | 92 | 1 | 250 | 78 | 34 |
| 6 | 95.9 | 3 | 230 | 74 | 12 |
| 7 | 97.1 | 1 | 160 | 75 | 17 |

Notes:
[a] Calcium carbonate equivalent by the Ag-lime method.

Figure 6A:
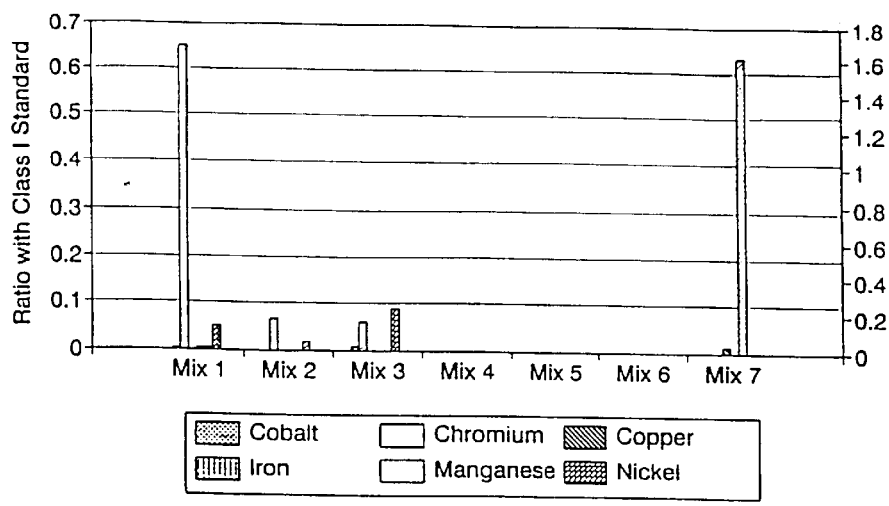
FIG. 6 shows the ratio of the leachate content of an element divided by the Class I groundwater standard for such element for cured mortars of mixes numbered 1 through 7, as described in Table 7, where the leachate content is reported for (a) cobalt, iron, chromium, managanese, copper and nickel; (b) lead, antimony, selenium and zinc; and (c) silver, barium arsenic, beryllium, boron and cadmium.
Figure 6B:
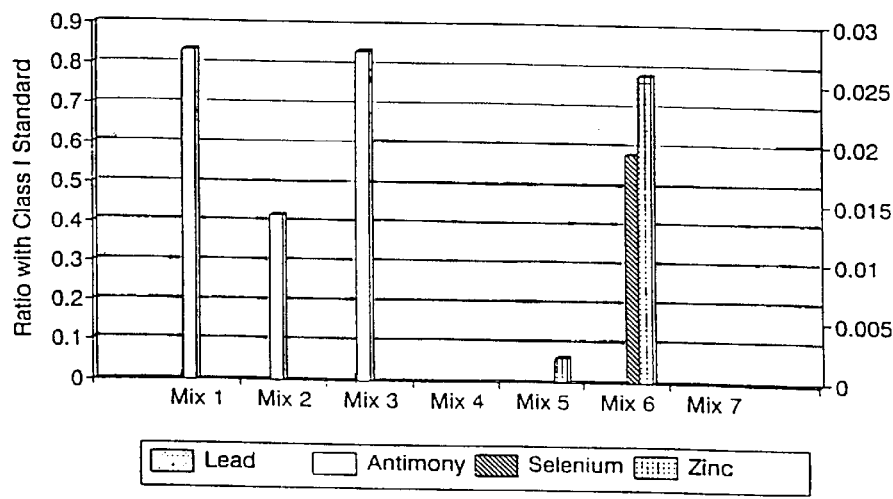
Figure 6C:
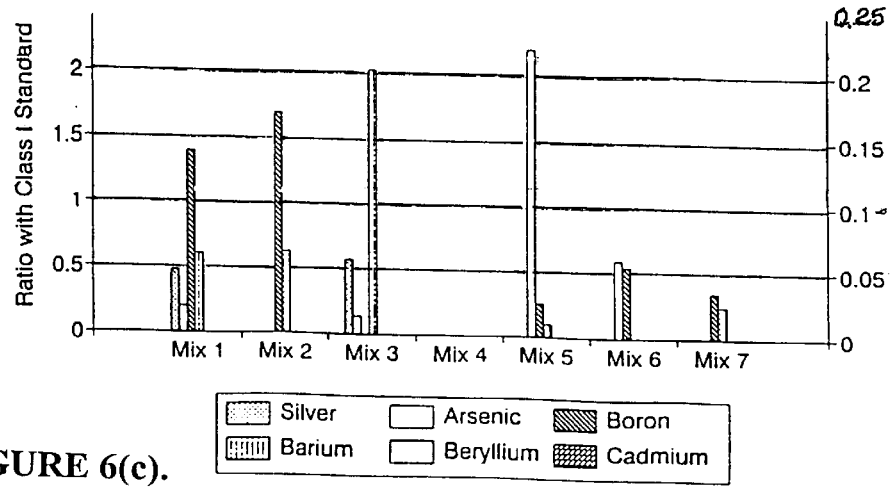

From an environmental standpoint, one of the advantages obtained by combining waste and by-product streams into the novel mixes and mortars of the present invention is to obtain a product that is environmentally more benign than one or more of the individual components. An advantage of cured mortars produced from the present mixes is that they produce lower amounts of harmful elements in leachate than the components that they comprise. FIGS. 6(a), 6(b), and 6(c) illustrate the leaching properties of cured mortars of the seven selected mixes. In each figure, the vertical ("Y") axis represents the ratio of the concentration of selected elements observed in ASTM Method D-3987 shake-test leachates divided by the Class I drinking water standard concentration for the same elements. In other words, if the value reported on the "Y" axis is 1.0, or less, the ASTM shake-test leachate meets Class I drinking water standards for that element. Of course, many waters potentially impacted by activities at mine sites are naturally Class II or IV, which provide much less stringent limits. As can be seen from the figures, only three values were observed to exceed the Class I limits. One of the mixes involving PCC fly ash "A" and coal slurry "A" and another mix with coal slurry "A" and cyclone fly ash "B" exceed the boron standard by about one ppm. One of the mixes involving PCC fly ash "C" and coal slurry "B" exceed the arsenic standard by 51 ppb. However, it was believed that this concentration is falsely high due to background noise in the inductively coupled plasma (ICP) analysis techniques.

It is believed that there are few actual settings wherein a 3 ppm boron concentration would be environmentally harmful. The boron in the mixes is believed to be derived from coal slurry "A" and, in particular, from the fly ashes. It is important to note that if the fly ashes alone were subjected to the same test, the boron concentrations would be almost 10 times the level reported for the mixes. Thus, by placing the fly ashes in mixtures with other selected wastes, the amount of boron leaching was significantly reduced.

Figure 7:
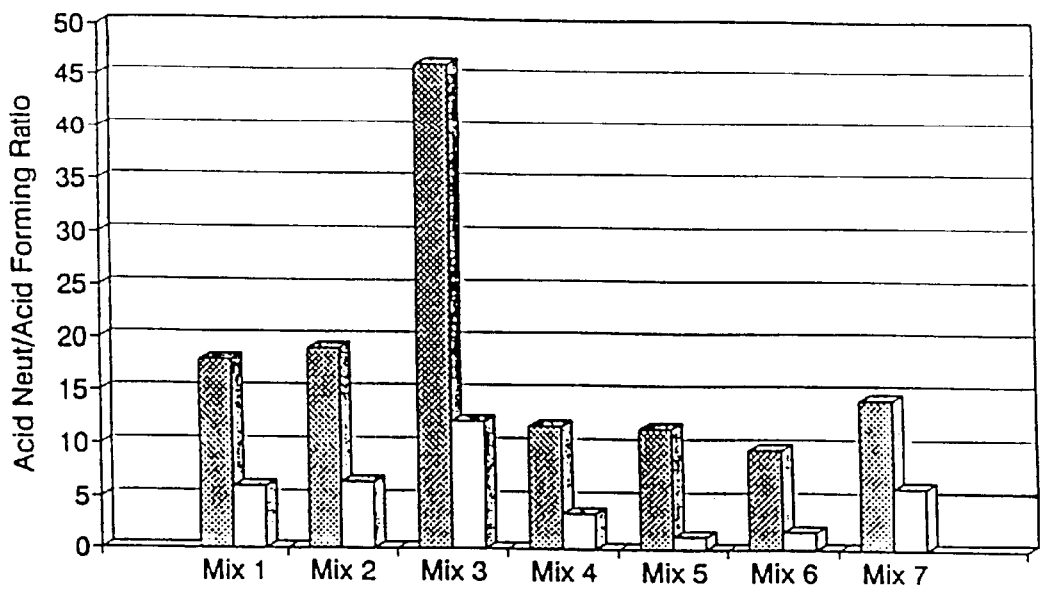
FIG. 7 shows the acid potentials and the base potentials for mixes numbered 1 through 7, as described in Table 7.

The acid and base potentials for the seven selected mixes are illustrated in FIG. 7. The figure shows the maximum net amount of acid a mix could produce assuming that all of the sulfur of the mix were contained in pyrite, and contrasts this value against the maximum amount of acid that a mix could neutralize with the calcium carbonate in the mix as measured by the CCE test. A stoichiometrically balanced acid/base potential would be indicated by both values being the same. However, based on prior experience, it is believed that anytime the value of the acid/base potential is about 1:7, or lower, a cured mortar made from the mix will not produce acid drainage and, in addition, will provide the advantageous characteristic of reduced leaching. Without wishing to be bound by this or any other theory, it is believed that a reason that the acid/base potential must be so far out of apparent stoichiometric equivalence is the reduction in the CCE caused by curing reactions and other redox reactions— including those which result in reduced leaching of harmful elements.

EXAMPLE 3

This example illustrates the production and field demonstration of several mortars made from the novel mixes.

In this example, five mixes that were the same as, or similar to, the selected mixtures described in Example 2 were produced and used as fill materials in a larger-scale field demonstration. The components that were used to form the mixtures were the same as described in Example 1. The composition of the dry mixes for these five test samples is shown in Table 9.

TABLE 9

Composition of mixes used for field demonstration

| PIT NO. | COAL SLURRY "A" (%)[a] | COAL SLURRY "B" (%) | FLY ASH "A" (%) | FLY ASH "B" (%) | F-TYPE FLY ASH (%) | FBC FLY ASH "C" (%) | FLY ASH STABILIZED SCRUBBER SLUDGE (%) | LIME WASTE (%) |
|---|---|---|---|---|---|---|---|---|
| P1 | 34 | | 42 | | | | | 24 |
| P2 | 36 | | | 39 | | | | 25 |
| F1 | | 40 | | | | 60 | | |
| F2 | | 34 | | | 34 | 32 | | |
| F3 | | 34 | | | | 32 | 34 | |

Notes:
[a]The amounts of all ingredients are given as weight percent of the solids. Ingredients were added in a moist, as received, state. Approximate moisture contents for the various ingredients were: Coal slurry "A" = 30%–35%; Coal slurry "B" = 20%–25%; Fly ash "A" = dry; Fly ash "B" = 15%; F-Type Fly ash was mixed with 15%, by weight, bottom ash, the moisture level of the mixture of the two was = 15%; FBC fly ash "C" = dry; Scrubber sludge = 16%; and Lime waste = 60%.

Two sites were selected for the field demonstration. Both sites were adjacent to active coal mining operations. A hydrogeologic study of the two test sites was conducted and groundwater monitoring wells were installed and prepared for monitoring the impact on groundwater quality of surface placement of the test mixtures.

At Site I, two test cells (each 20 ft×20 ft×8 ft) were filled during November of the first year of the test. One cell was filled with a mortar having the composition shown in Table 9 for Pit No. P1, and the other cell with a mortar having the composition shown for Pit No. P2. The mixtures were prepared by loading the mix components into a 10 ft.×10 ft.×5 ft deep pit, adding water and mixing the components for about 15 minutes with a large back-hoe. The mortar was then pumped to the test cells with a Schwing 750 concrete pump. This was repeated as needed to obtain sufficient mortar to fill the test cell. The slump of the mortars in the pits varied from 6 to 8 inches.

Three test pits were prepared at Site II. The pits were the same size as those used at Site I. To blend the components of the Site II mixes, all components were placed into one mine shuttle car and the contents of this car were dumped into a second shuttle car. The second car then dumped the mixture back into the first car. This dumping was repeated until the components were intermixed. The blended materials were then placed into a test pit and mixed with additional water using a one-cubic yard back-hoe. This in-place mixing resulted in a mix having consistent properties throughout and having 6" to 8" of slump.

Samples of the mortars placed in Pit Nos. F1 and F3 were tested for compressive strength. The compressive strength for the two cured mortars was found to be 220 psi and 150 psi, respectively, as compared with strengths of 250 psi and 160 psi for laboratory prepared samples having the same composition as the mortars in the field pits. This indicated that blending of the mortar components in the field provided mortars having the expected characteristics.

The mixtures in the test pits at the two sites were allowed to cure under environmental conditions that were normal for December—March in the Midwest. Cores of the cured material from each of the test cells were taken four months after they were placed into the pits. The uniaxial compressive strength, bearing capacity of low strength materials (using a penetrometer), and liquid limits of the materials were determined. The materials were also subjected to ASTM shake tests for leaching and tested for CCE.

Figure 8:
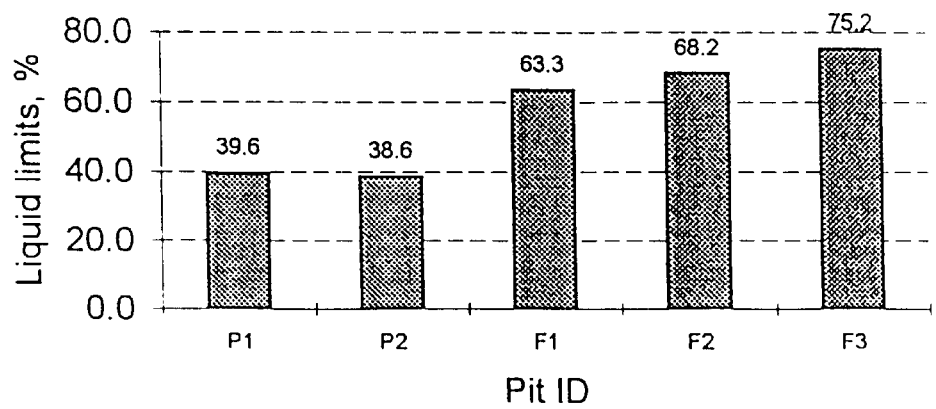
FIG. 8 shows the liquid limits for freshly mixed mortars of the type that were prepared for field demonstration pits P1, P2, F1, F2 and F3, as described in Table 9.

The liquid limits of the mortars were determined by the AASHTO 89-86 procedure and are shown in FIG. 8. The liquid limit numbers measured for the mortars indicated very high liquid limits (63%–75%) for materials at Site II (F1–F3), while liquid limits for cured mortars at Site I (P1 and P2) were around 39%. This indicates that the cured Site II mortars could hold significantly more water before passing from a plastic to a liquid stage than could the Site I materials.

Figure 9A:
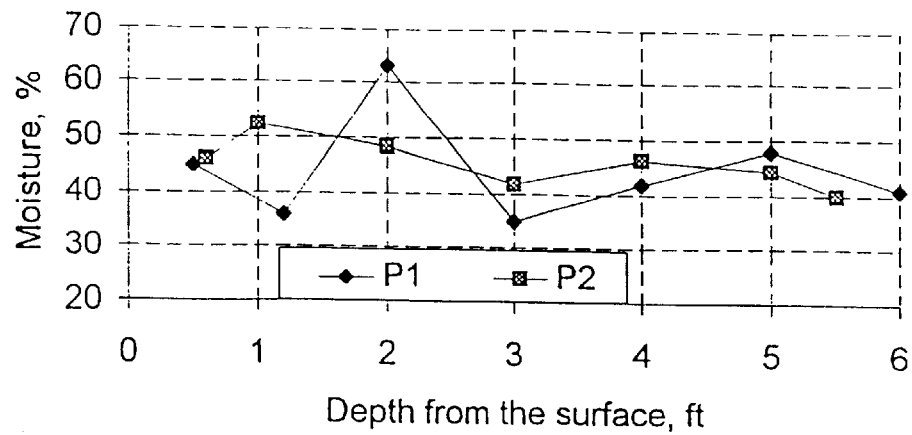
FIG. 9 shows the moisture content as a function of depth below the surface for the cured mortars of field pits (a) P1 and P2, and (b) F1, F2 and F3.
Figure 9B:
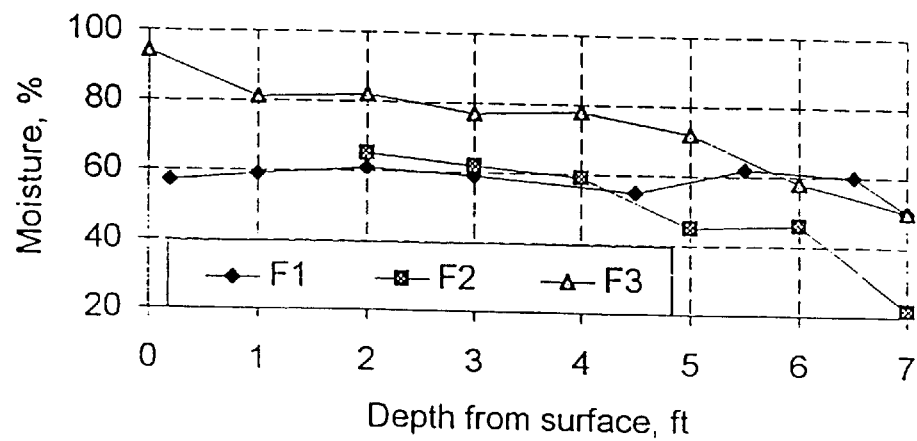

The moisture contents of the cured mortars at different depths are shown in FIGS. 9(a), for the Site I materials, and 9(b), for the Site II materials. It was found that the moisture content of all Site II materials were considerably higher than for the Site I materials. It is believed that high moisture content indicates that the materials are capable of holding moisture, which may improve their properties as plant growth media.

Figure 10A:
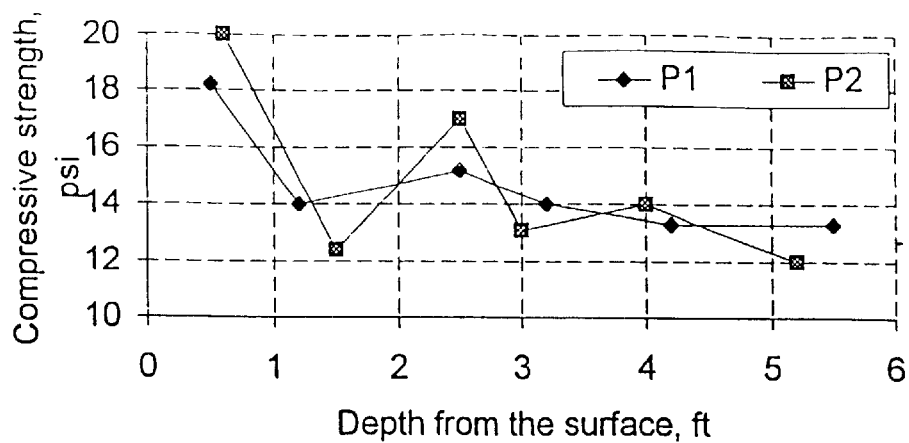
FIG. 10 shows the compressive strength as a function of depth below the surface for the cured mortars of field pits (a) P1 and P2, and (b) F1, F2 and F3.
Figure 10B:
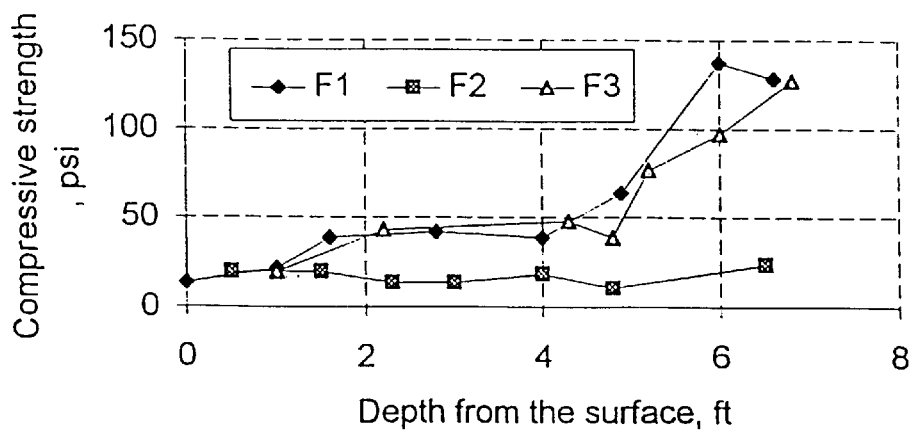

The uniaxial compressive strength of the cured mortars as a function of depth is shown in FIGS. 10(a) and 10(b). The compressive strengths of the materials at Site I were somewhat lower than would have been predicted from laboratory data. It was believed that this could have been due to the high moisture content of the mortars and/or to inadequate mixing by the in-situ mixing method. On the other hand, two of the three materials at Site II attained strengths of over 100 psi at six feet or more depth, while strength at 0–2 feet were typically 20–40 psi. The surface load-bearing characteristics at the two sites indicated that large farm equipment and large trucks could easily operate on the cured materials.

The leaching characteristics for the test mortars were measured for several metals and other elements of interest for the cured field-test mortars of Table 9. The leaching tests were run according to ASTM method D-3987, with shake flasks having 20 parts water to 1 part solids. Leaching tests were run on the freshly cured (as poured) mortars and on cores taken from the field sites after slightly over one year of exposure to the weather. The cores taken from the field sites were sampled at 0 to 6-inch depth and at 6 to 12-inch depth. The intent was to observe any indication of migration of elements and to observe the impact of weathering on leaching characteristics.

The following observations were made about the FBC-based mixes (Pit Nos. F1–F3 of Table 9):

The cured mortars were relatively free of leaching of most heavy metals and harmful elements. This was an interesting result because the coal processing waste in those mixes had acid producing and acid neutralizing potentials that were close and the waste, by itself, was subject to some toxic and heavy metals leaching. Elements that were not found in the leachate of either the as-poured mortar or the core samples at levels above the noise level of the instrument in the ASTM D-3987 shake tests at any stage were silver, arsenic, barium, beryllium, cadmium, cobalt, chromium, copper, iron, manganese, molybdenum, nickel, lead, antimony, selenium, thallium and vanadium.

Although most trace elements leached in low enough concentrations to be difficult to sense above background noise, there were indications that zinc rapidly becomes depleted from the cured mortars, as shown in Table 10. The as-poured field mortars both leached traces of zinc, whereas the near-surface material after one year of weathering showed zinc concentrations near the detection limit of the instrument. In contrast, aluminum seemed to become more mobile as the mixes aged, particularly in the case of the material in Pit F2. However, none of the aluminum levels were toxic or high enough to produce an undesirable impact on the taste or usability of ground water.

TABLE 10

Trends in the leaching of minor elements as determined by ASTM D-3987 shake tests.

| | Zinc in leachate (ppm) | Aluminum in leachate (ppm) | Boron in leachate (ppm) |
|---|---|---|---|
| PIT F1 | | | |
| As-poured field sample | 0.25 | 0.02 | 0.14 |
| Core sample; 1-yr; 12 inch depth | 0.01 | 0.08 | 2.68 |
| Core sample; 1-yr; 6 inch depth | 0.02 | 0.11 | 2.47 |
| PIT F2 | | | |
| As-poured field sample | 0.18 | 0.06 | 0.33 |
| Core sample; 1-yr; 12 inch depth | 0.26 | 1.09 | 0.1 |
| Core sample; 1-yr; 6 inch depth | 0.02 | 1.63 | 0.4 |

The concentrations of alkali-oxides, which cause high dissolved solids and high pH values in leachates, dropped rapidly as they were converted to more stable salts. The alkali metals in fresh coal combustion ash are usually in the form of unhydrated oxides, which are unstable in the cooler and moister environments they are usually exposed to upon disposal. This can result in increased concentrations of alkali metals in leachates as the oxide phases hydrate and eventually convert to carbonates. The alkali metal oxides also produce somewhat alkaline pH values (around pH=12) in the water they contact. These trends were obvious in the ASTM D-3987 shake tests for the F1 and F2 materials. Table 11 shows data that illustrate these points.

TABLE 11

Metals and sulfate concentrations leached from samples of cured mortars from F1 and F2 mixes in ASTM D-3987 shake-test

| | Concentrations in shake-test leachate (ppm) | | | | | |
|---|---|---|---|---|---|---|
| | pH | Calcium | Potassium | Sodium | Magnesium | Sulfate |
| MIX IN PIT F1 | | | | | | |
| As-poured field sample | 11.44 | 1422 | 5 | 42 | 0 | |
| Core sample; 1-yr; 12 inch depth | 9.27 | 626 | 42 | 38 | 7 | 1584 |
| Core sample; 1-yr; 6 inch depth | 8.88 | 648 | 29 | 29 | 15 | 1780 |
| MIX IN PIT F2 | | | | | | |
| As-poured field sample | 11.47 | 1397 | 4 | 34 | 0 | |
| Core sample; 1-yr; 12 inch depth | 12.17 | 1212 | 12 | 24 | 0.13 | 1081 |
| Core sample; 1-yr; 6 inch depth | 9.62 | 620 | 10 | 22 | 1.64 | 1581 |

The data of Table 11 indicate that the leaching behavior of the mixes is relatively benign. The results indicate a rapid alteration of the unstable alkali oxides in just over a year, with resulting drops to pH values characteristic of carbonate and gypsum systems. After reaching pH values near 9, calcium and sulfate comprise almost all of the dissolved solids and the ratio between the two suggests that they are primarily the result of simple gypsum dissolution. The minor alkali metals, while not toxic or environmentally harmful at the levels experienced, may become more mobile in order of decreasing electronegativity; the decreasing trend for sodium and the increasing trend for magnesium and potassium was observed.

The cured mortars from pits P1 and P2, like the F1 and F2 mortars, indicated little trace element leaching. The P1 and P2 mixes produced more molybdenum and vanadium in leachate than did the F2 and F2 mixes, but did not produce zinc. There were indications that the lime waste in the P1 and P2 mixes was not thoroughly intermixed with other components of the mix.

Groundwater flow at Site II was primarily within a shallow confined glacial aguifer. The aquifer was bounded below by Pennsylvanian rocks, primarily shale, and above by Quaternary silty deposits. Nine field tests yielded a geometric mean hydraulic conductivity of $2.9 \times 10^{-5}$ ft/s ($8.8 \times 10^{-6}$ m/s) for the aquifer. At Site I, groundwater flows through strip mine spoils. This unconfined hydrostratigraphic unit is bounded below by Pennsylvanian rocks, primarily shale. Ten field tests yielded a geometric mean hydraulic conductivity of $1.3 \times 10^{-5}$ ft/s ($3.96 \times 10^{-6}$ m/s). At each demonstration site, two upgradient wells provided background water quality samples, whereas four wells provided downgradient water quality samples.

The ambient water quality at Site I is typical of areas impacted by surface mining. The ambient water quality at Site II showed little impact from current mining operations. Field results of groundwater monitoring over two years after filing the test cells revealed no impact of the test pits at either Site I or Site II on groundwater quality.

A preliminary study showed the potential for plant growth on each of the cured mixtures. Oats were grown successfully on all of the cured test cells by supplying iron only through foliar feeding. Some of the oat leaves were harvested for nutrient analysis while the remainder of the plants were harvested for grain.

All references cited in this specification, including without limitation all papers, publications, presentations, texts, reports, manuscripts, brochures, internet postings, journal articles, periodicals, and the like, are hereby incorporated by reference. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A fill material consisting essentially of waste coal from coal processing waste, and a by-product composition selected from the group consisting of (a) at least one coal combustion by-product, at least one of which is a neutralizing/stabilizing by-product and (b) a combination of at least one coal combustion by-product and a neutralizing/stabilizing by-product that is not a coal combustion by-product.

2. The fill material of claim 1, wherein the by-product composition is at least one coal combustion by-product, at least one of which is a neutralizing/stabilizing by-product.

3. A fill material comprising, by weight, from about 25% to about 60% coal processing waste and about 40% to about 75% by-product composition, wherein the coal processing waste comprises waste coal and the by-product composition is at least one coal combustion by-product, at least one of which is a neutralizing/stabilizing by-product.

4. The fill material of claim 3, wherein the fill material comprises, by weight, from about 30% to about 60% coal processing waste and from about 40% to about 70% of the by-product composition.

5. The fill material of claim 4, wherein the fill material comprises, by weight, from about 30% to about 45% coal processing waste and from about 55% to about 70% of the by-product composition.

6. The fill material of claim 2, wherein the fill material is a mix and the total amount of the by-product composition in the mix is sufficient to provide that the fill material has an acid/base potential of at most about 1/1.

7. The fill material of claim 1, wherein the by-product composition comprises, by weight, about two-thirds coal combustion by-product and about one-third lime waste.

8. The fill material of claim 6, wherein the mix comprises, by weight, from about 30% to about 40% coal processing waste and from about 60% to about 70% of a coal combustion by-product selected from the group consisting of Class F-fly ash, Class C-fly ash, ponded fly ash, fluidized bed combustion ash, wet scrubber sludge, and mixtures thereof.

9. The fill material of claim 1, wherein the fill material comprises, by weight, from about 30% to about 40% coal processing waste; from about 20% to about 25% lime waste; and from about 35% to about 55% of a coal combustion by-product selected from the group consisting of Class F-fly ash, Class C-fly ash, ponded fly ash, fluidized bed combustion ash, wet scrubber sludge, and mixtures thereof.

10. The fill material mix of claim 6, wherein the acid/base potential is lower than about 1/2.

11. The fill material mix of claim 10, wherein the acid/base potential is lower than about 1/4.

12. The fill material mix of claim 11, wherein the acid/base potential is lower than about 1/7.

13. The fill material mix of claim 12, wherein the acid/base potential is lower than about 1/10.

14. The fill material of claim 1, wherein the fill material is a mortar and further comprises water in an amount sufficient to permit curing of the mixture.

15. The fill material of claim 14, wherein the amount of by-product composition in the mortar is sufficient to provide that the mortar has an acid/base potential of 1/1 or less.

16. The fill material of claim 15, wherein the mortar comprises from about 25% to about 60% coal processing waste and about 40% to about 75% of the by-product composition, in percent by weight of solids, and from about 30% to about 50% of water, in percent by weight of the mortar.

17. The fill material of claim 16, wherein the mortar comprises from about 30% to about 45% coal processing waste and about 55% to about 70% of the by-product composition, in percent by weight of solids, and from about 32% to about 42% of water, in percent by weight of the mortar.

18. The fill material of claim 17, wherein the mortar comprises from about 30% to about 40% coal processing waste and from about 60% to about 70% of a coal combustion by-product selected from the group consisting of Class F-fly ash, Class C-fly ash, ponded fly ash, fluidized bed combustion ash, wet scrubber sludge, and mixtures thereof, in percent by weight of solids, and from about 32% to about 42% of water, in percent by weight of the mortars.

19. The fill material of claim 18, wherein the mortar comprises from about 30% to about 40% coal processing waste; from about 20% to about 25% lime waste; and from about 35% to about 55% of a coal combustion by-product selected from the group consisting of Class F-fly ash, Class C-fly ash, ponded fly ash, fluidized bed combustion ash, wet scrubber sludge, and mixtures thereof, in percent by weight of solids, and from about 34% to about 42% of water, in percent by weight of the mortar.

20. A cured fill material comprising a cured product of the fill material of claim 14.

21. The cured fill material of claim 20, wherein the cured product has an acid/base potential of 1/1, or lower.

22. The cured fill material of claim 21, wherein the cured fill material comprises a cured product of a mixture of from about 30% to about 40% coal processing waste; from about 20% to about 25% lime waste; and from about 35% to about 55% of a coal combustion by-product selected from the group consisting of Class F-fly ash, Class C-fly ash, ponded fly ash, fluidized bed combustion ash, wet scrubber sludge, and mixtures thereof, in percent by weight of the solids, and from about 34% to about 42% of water, in percent by weight of the mixture.

23. The fill material of claim 22, wherein the fill material develops a strength of at least about 20 psi, as measured by a pocket penetrometer, within three days.

24. The fill material of claim 23, wherein the fill material develops a strength of at least about 60 psi, as measured by a pocket penetrometer, within three days.

25. The fill material of claim 22, wherein the fill material develops a strength of at least about 60 psi, as measured by a pocket penetrometer, within two days.

26. The fill material of claim 22, wherein the fill material develops a 28-day strength, as measured by a pocket penetrometer, of at least about 50 psi.

27. The fill material of claim 26, wherein the fill material develops a 28-day strength, as measured by a pocket penetrometer, of at least about 150 psi.

28. The fill material of claim 27, wherein the fill material develops a 28-day strength, as measured by a pocket penetrometer, of at least about 250 psi.

29. The fill material of claim 28, wherein the material has a 28-day density of between about 65 pounds per cubic foot (pcf) and 80 pcf.

30. A method for stabilizing coal processing waste, comprising intermixing water, coal processing waste that includes waste coal, and a by-product composition selected from the group consisting of (a) at least one coal combustion by-product, at least one of which is a neutralizing/stabilizing by-product and (b) a combination of at least one coal combustion by-product and a neutralizing/stabilizing by-product that is not a coal combustion by-product, in proportions sufficient to form a mixture having an acid/base potential of 1/1, or lower, to produce the fill material of claim 1.

31. The method of claim 30, wherein the mixture is more stable than is the coal processing waste, the at least one coal combustion by-product, and the neutralizing/stabilizing by-product prior to the intermixing.

32. A fill material as set forth in claim 1 wherein the fill material is free of portland cement.

33. A fill material as set forth in claim 32 wherein the fill material is also free of further acids, bases and commercial chemicals and fertilizers.

34. A fill material as set forth in claim 2 wherein each coal combustion by-product is selected from the group consisting of fly ash, bottom ash and scrubber sludges.

35. A fill material as set forth in claim 33 wherein each coal combustion by-product is selected from the group consisting of fly ash, bottom ash and scrubber sludges.

36. A fill material as set forth in claim 2 wherein the waste coal is in the form of particles of at most about 0.25 inches in diameter.

37. A fill material as set forth in claim 32 wherein the coal combustion by-products provide sufficient binding potential to stabilize the fill material the fill material is free of other binding additives.

38. A fill material comprising waste coal from coal processing waste, and a by-product composition selected from the group consisting of (a) at least one coal combustion by-product, at least one of which is a neutralizing/stabilizing by-product and (b) a combination of at least one coal combustion by-product and a neutralizing/stabilizing by-product that is not a coal combustion by-product, the fill material being free of Portland cement and substantially free of any acid or base that is not a coal combustion by-product or a neutralizing/stabilizing by-product.

* * * * *